United States Patent
Hongo et al.

(10) Patent No.: US 8,203,913 B2
(45) Date of Patent: Jun. 19, 2012

(54) RECORDING/REPRODUCTION APPARATUS AND RECORDING/REPRODUCTION SYSTEM

(75) Inventors: Kazuhiro Hongo, Kanagawa (JP); Tetsu Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 28 days.

(21) Appl. No.: 12/627,592

(22) Filed: Nov. 30, 2009

(65) Prior Publication Data

US 2010/0157747 A1 Jun. 24, 2010

(30) Foreign Application Priority Data

Dec. 19, 2008 (JP) ................................. 2008-324271

(51) Int. Cl.
*G11B 11/00* (2006.01)
(52) U.S. Cl. .................................................. 369/13.01
(58) Field of Classification Search .................. None
See application file for complete search history.

(56) References Cited

U.S. PATENT DOCUMENTS

| | | | |
|---|---|---|---|
| 7,054,234 B2 * | 5/2006 | Saga et al. .................. | 369/13.33 |
| 7,547,868 B2 | 6/2009 | Hongo et al. | |
| 2002/0051422 A1 * | 5/2002 | Sugiura et al. ............. | 369/275.1 |
| 2003/0223316 A1 * | 12/2003 | Saga et al. .................. | 369/13.33 |
| 2004/0085862 A1 * | 5/2004 | Matsumoto et al. ........ | 369/13.33 |
| 2008/0080039 A1 * | 4/2008 | Hongo et al. ................. | 359/237 |
| 2008/0191122 A1 * | 8/2008 | Hongo et al. ............... | 250/201.5 |
| 2009/0207703 A1 * | 8/2009 | Matsumoto et al. ........ | 369/13.33 |
| 2010/0128577 A1 * | 5/2010 | Kotani ........................ | 369/13.24 |
| 2010/0157747 A1 * | 6/2010 | Hongo et al. ............... | 369/13.24 |

FOREIGN PATENT DOCUMENTS

JP 4322891 6/2009

OTHER PUBLICATIONS

U.S. Appl. No. 12/613,653, filed Nov. 6, 2009, Hongo.

\* cited by examiner

*Primary Examiner* — Joseph Feild
*Assistant Examiner* — Henok Heyi
(74) *Attorney, Agent, or Firm* — Oblon, Spivak, McClelland, Maier & Neustadt, L.L.P.

(57) ABSTRACT

A recording/reproduction apparatus includes: a light source; and a near-field light production section that includes two conductor sections disposed opposite each other with a predetermined gap therebetween and that produces near-field light between the two conductor sections upon light irradiation from the light source, the two conductor sections being disposed such that when information is recorded on a recording medium using the near-field light, a direction from one of the two conductor sections to the other of the two conductor sections is generally perpendicular to a line direction of the recording medium.

12 Claims, 18 Drawing Sheets

RECORDING/REPRODUCTION APPARATUS AND RECORDING/REPRODUCTION SYSTEM

BACKGROUND OF THE INVENTION

1. Field of the Invention

The present invention relates to a recording/reproduction apparatus and a recording/reproduction system, and more particularly to a recording/reproduction apparatus and a recording/reproduction system that use near-field light.

2. Description of the Related Art

In recent years, technologies in which near-field light is utilized as recording light to record information on information recording media at a high density have been proposed. In the case where near-field light is used, it is possible to form minute light spots that exceed the diffraction limit of light. For example, a heat-assisted magnetic recording technology that uses near-field light is receiving attention as a promising next-generation high-density magnetic recording technology. There are proposals for various applications of near-field light to information recording media that use magneto-optical recording films or phase-change recording films.

One method for producing near-field light uses a surface plasmon resonance phenomenon that occurs when a conductor is irradiated with light. In the method, for example, when a conductor that is in the shape of a rectangular parallelepiped and that is formed on a transparent substrate is irradiated with light, the polarization direction of which coincides with the longitudinal direction of the conductor, the electric field of the irradiation light causes polarization of charge in the conductor. Vibration of the polarized charge is called "surface plasmon". When the resonant wavelength of the surface plasmon and the wavelength of the irradiation light match each other, resonance called "surface plasmon resonance" occurs. In this case, the conductor forms an electric dipole strongly polarized in its longitudinal direction. When the conductor forms an electric dipole, a large electromagnetic field is produced in the vicinity of both longitudinal ends of the conductor, which produces near-field light.

A technology for producing near-field light utilizing the surface plasmon resonance phenomenon of a conductor discussed above to record a servo signal using near-field light is proposed in the related art (see Japanese Unexamined Patent Application Publication No. 2007-334989 (JP-A-2007-334989), for example). FIG. 24 shows the configuration of a portion of a floating head proposed in JP-A-2007-334989 around a conductor. In a floating head 100 according to JP-A-2007-334989, a conductive layer 102 that produces a magnetic field is provided in a surface 101 opposing a magnetic disc, and the conductive layer 102 is reduced in width at a portion along the current application direction to form a pair of narrow portions 103.

According to JP-A-2007-334989, the pair of narrow portions 103 are irradiated with light with a current applied to the conductive layer 102 to produce a magnetic field. This causes the narrow portions 103 to produce near-field light so that a pair of servo signals are recorded at the pair of narrow portions 103 through the magnetic field and the near-field light. In the technology proposed in JP-A-2007-334989, as described above, a pair of servo signals are recorded using a narrow track width to achieve a high track pitch.

SUMMARY OF THE INVENTION

In order to record information at a further high density in an optical recording scheme through near-field light or a heat-assisted magnetic recording scheme that utilizes near-field light, it is necessary to achieve high-density recording in both the line direction (track direction) of a recording medium and the direction perpendicular to the line direction (track pitch direction).

In the case where information is recorded directly on a recording medium through light, in general, recording marks to be formed are shrunk in the line direction compared to the spot shape of the light, and thus it is relatively easy to increase the recording density in the line direction. In the heat-assisted magnetic recording scheme, it is possible to increase the recording density in the line direction by utilizing technologies such as increasing the resolution of the magnetic field to be applied and a writing scheme with overlapping pits that uses pulsed light, in addition to reducing the spot size of near-field light.

Regarding the track pitch direction, in contrast, there is a problem of so-called "cross erasing" in which while information is being recorded in a recording track, an adjacent recording track is also heated to erase recording marks already recorded in the adjacent track, for both the optical recording scheme and the heat-assisted magnetic recording scheme discussed above. Therefore, in order to increase the recording density in the track pitch direction by solving the problem, it is necessary to further narrow the spot size of near-field light so as to heat adjacent tracks as least as possible.

In view of the foregoing, it is desirable to provide a recording/reproduction apparatus and a recording/reproduction system that use near-field light and that enable high-density recording in the track pitch direction.

According to an embodiment of the present invention, there is provided a recording/reproduction apparatus including: a light source; and a near-field light production section that includes two conductor sections disposed opposite each other with a predetermined gap therebetween and that produces near-field light between the two conductor sections upon light irradiation from the light source. The two conductor sections are disposed such that when information is recorded on a recording medium using the near-field light, a direction from one of the two conductor sections to the other of the two conductor sections is generally perpendicular to a line direction of the recording medium. The "generally perpendicular" relationship between a direction from one of the pair of conductor sections to the other of the pair of conductor sections and the line direction of the recording medium as referred to herein is intended to mean not only the case where both the directions are exactly perpendicular to each other but also the case where both the directions are not exactly, but substantially, perpendicular to each other because of production variations or the like.

According to an embodiment of the present invention, there is provided a recording/reproduction system including: a recording medium; a light source; and a near-field light production section that includes two conductor sections disposed opposite each other with a predetermined gap therebetween and that produces near-field light between the two conductor sections upon light irradiation from the light source. The two conductor sections are disposed such that when information is recorded on the recording medium using the near-field light, a direction from one of the two conductor sections to the other of the two conductor sections is generally perpendicular to a line direction of the recording medium.

In the present invention, as discussed above, the two conductor sections which produce near-field light are disposed such that a direction from one of the two conductor sections to the other of the two conductor sections is generally perpendicular to the line direction of the recording medium when information is recorded. With such a configuration, the two conductor sections, which are disposed in the direction perpendicular to the line direction of the recording medium, suppress the spread of spots formed by the near-field light in the direction perpendicular to the line direction of the recording medium. Therefore, adjacent tracks are not easily heated, preventing cross erasing of the adjacent tracks. Thus, according to the present invention, high-density recording is enabled in the direction perpendicular to the line direction of the recording medium (track pitch direction).

DESCRIPTION OF THE PREFERRED EMBODIMENTS

Exemplary configurations of a recording/reproduction apparatus and a recording/reproduction system according to embodiments of the present invention will be described below in the following order with reference to the drawings. It should be noted that the present invention is not limited to the examples given below.

1. First Embodiment: Exemplary Basic Configuration
2. Modification 1: Modification of Near-field Light Production Section
3. Modification 2: Modification of Storage Medium
4. Modification 3: Modification of Recording/Reproduction Apparatus
5. Second Embodiment: Exemplary Configuration with Optimized Gap between Recording Medium and Near-field Light Production Section <1. First Embodiment>
[Configuration for Near-field Light Generation]

Figure 1:
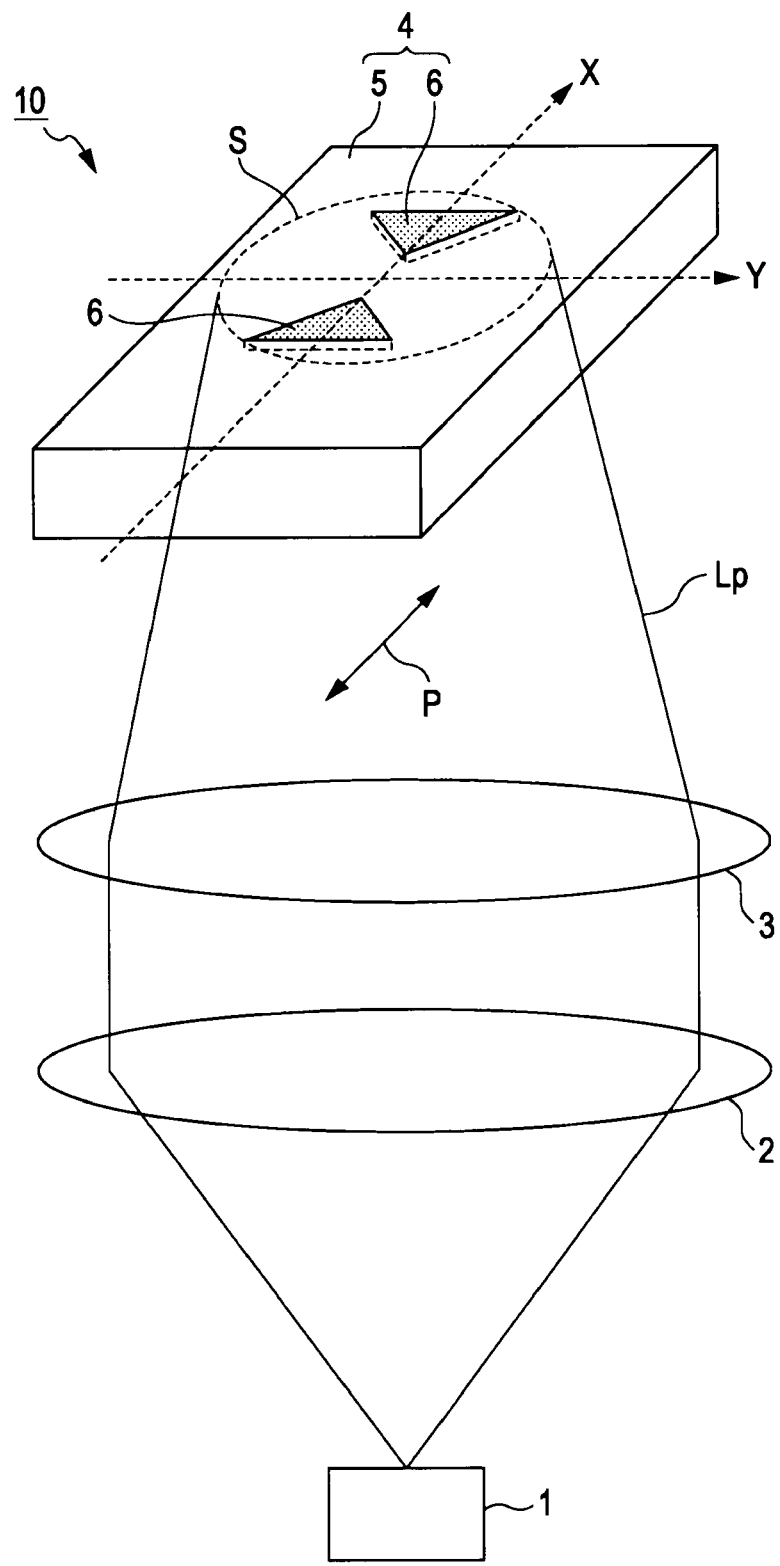
FIG. 1 shows a schematic configuration of a recording/reproduction apparatus according to a first embodiment.

FIG. 1 shows an exemplary schematic configuration of a section that generates near-field light (hereinafter referred to as "near-field light generation section") of a recording/reproduction apparatus according to a first embodiment of the present invention. The recording/reproduction apparatus according to the embodiment may be an optical recording apparatus or a heat-assisted magnetic recording apparatus that uses near-field light. A near-field light generation section 10 mainly includes a light source 1, a collimator lens 2, a condensing lens 3, and a near-field light production section 4.

The light source 1 emits light polarized in a predetermined direction (hereinafter referred to as "propagation light"). In the embodiment, as shown in FIG. 1, the polarization direction P of the propagation light Lp is parallel to a direction from one of a pair of conductors 6 to the other of the pair of conductors 6 to be discussed later (X direction in FIG. 1). The propagation light Lp emitted from the light source 1 may be of any wavelength that allows generation of near-field light between the pair of conductors 6. For example, the propagation light Lp may be light at a wavelength of 780 nm.

The collimator lens 2 converts the propagation light Lp emitted from the light source 1 into parallel light. The condensing lens 3 condenses the parallel light such that the near-field light production section 4 is irradiated with the propagation light Lp with a predetermined spot size S.

Figure 2A:
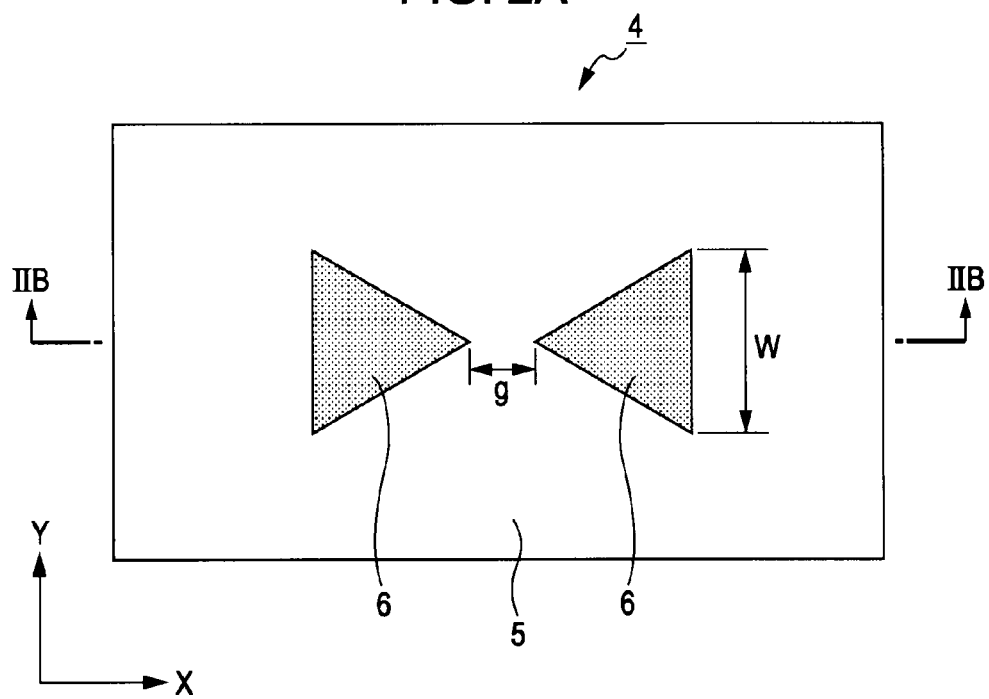
FIG. 2A is a top view of a near-field light production section according to the first embodiment.
Figure 2B:
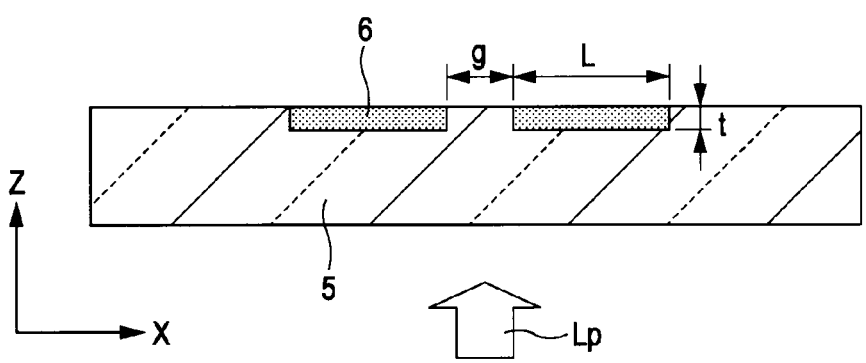
FIG. 2B is a cross-sectional view taken along the line IIB-IIB in FIG. 2A.

FIG. 2 shows a schematic configuration of the near-field light production section 4. FIG. 2A is a top view of the near-field light production section 4. FIG. 2B is a cross-sectional view taken along the line IIB-IIB in FIG. 2A. The near-field light production section 4 includes a substrate 5 and two conductors 6 formed in one surface of the substrate 5. The propagation light Lp from the light source 1 is incident on the other surface of the substrate 5, in which no conductors 6 are formed.

The substrate 5 is formed as an optically transparent plate-like member. The substrate 5 is formed from a material that has an optical transparency at the wavelength of use. For example, the substrate 5 is desirably formed from a material with a transparency of about 70% or higher in the wavelength band of use. More specifically, examples of the material for forming the substrate 5 include group IV semiconductors such as Si and Ge, and III-V group compound semiconductors represented by GaAs, AlGaAs, GaN, InGaN, InSb, GaSb, and AlN. Additional examples of the material for forming the substrate 5 include group II-VI compound semiconductors such as ZnTe, ZnSe, ZnS, and ZnO. Further examples of the material for forming the substrate 5 include oxide insulators such as ZnO, $Al_2O_3$, $SiO_2$, $TiO_2$, $CrO_2$, and $CeO_2$, nitride insulators such as SiN, and plastics.

Both of the two conductors 6 (conductor sections) are formed of a metal film having a triangular shape. Although the two conductors 6 have the same shape in the example of FIG. 2, the two conductors 6 may have slightly different shapes with respect to the angle of a vertex of one of the two conductors 6 opposing the other of the two conductors 6, the length W of a side opposite the vertex, or the length L along the polarization direction P, for example, because of production variations or the like. The pair of conductors 6 are disposed such that a predetermined vertex of one conductor 6 and a corresponding vertex of the other conductor 6 oppose each other. Also, the two conductors 6 are disposed such that their opposing vertexes are spaced with a predetermined gap g (hereinafter also referred to as "gap size") therebetween in the direction matching the polarization direction P of the propagation light Lp (X direction in FIG. 1). That is, the pair of conductors 6 are disposed in a bow-tie arrangement. With respective convex portions of the pair of conductors 6 disposed opposite each other, generation of near-field light between the pair of conductors 6 is facilitated. The arrangement of the conductors 6 described above may be used to perform heat-assisted magnetic recording using near-field light, for example.

The size g of the gap between the two conductors 6 is set to be sufficiently smaller than the wavelength of the propagation light Lp. In the embodiment, the gap size g is set to the track pitch of a recording medium or less. The gap size g is adjusted appropriately such that when an area between the two conductors 6 is irradiated with propagation light Lp from the light source 1, near-field light at a sufficient intensity is produced between the two conductors 6 and the spot size of the near-field light is in a range appropriate for recording information.

In the embodiment, the pair of conductors 6 are embedded in one surface of the substrate 5 such that the surfaces of the conductors 6 and the surface of the substrate 5 are flush with each other (see FIG. 2B). The thus configured near-field light production section 4 may be fabricated as follows, for example. First, a substrate 5 in which recesses with a depth corresponding to the thickness t of the conductors 6 are formed at positions where the conductors 6 are to be formed is prepared. Then, a metal film is formed over the surface of the substrate 5 with the recesses. Finally, the metal film is polished until the portion of the surface of the substrate 5 that does not include the recesses is exposed. However, the present invention is not limited thereto. A pair of conductors 6 (metal film) in a predetermined shape may be formed on a flat surface of a substrate 5.

The conductors 6 may be formed from any material with a high conductivity such as a metal (Au, Ag, Pt, Cu, Al, Ti, W, Ir, Pd, Mg, or Cr, for example), a semiconductor (Si or GaAs, for example), or carbon nanotubes.

[Operation for Producing Near-field Light and Intensity Distribution of Near-field Light]

An operation for producing near-field light in the embodiment is as follows. First, the light source 1 emits propagation light Lp at a predetermined wavelength. The propagation light Lp is condensed between the pair of conductors 6 of the near-field light production section 4 via the collimator lens 2 and the condensing lens 3. At this time, the polarization direction P of the propagation light Lp and a direction from one of the pair of conductors 6 to the other of the pair of conductors 6 match each other. Therefore, charges are induced on a portion of the surface of the substrate 5 between the pair of conductors 6, which produces an electric field, that is, near-field light, that extends between the opposing ends of the pair of conductors 6. In the embodiment, the near-field light is used as light with which a recording medium is irradiated to record information.

In the embodiment, charges are induced on a portion of the surface of the substrate 5 between the pair of conductors 6 as discussed above to produce an electric field (=near-field light) that extends between the charges. It is therefore possible to control the spot size of near-field light by changing the size g of the gap between the pair of conductors 6. That is, it is possible to reduce the spot size of near-field light relatively easily by reducing the size g of the gap between the pair of conductors 6. The spot size of near-field light in the direction (Y direction in FIGS. 1 and 2) perpendicular to an axis joining the centers of the pair of conductors 6 varies in correspondence with the size g of the gap between the pair of conductors 6. The spot size of near-field light in the Y direction is greater than the spot size in the X direction because there are no objects that suppress the spread of near-field light in the Y direction.

The spread state and the intensity distribution of the near-field light discussed above during recording of information were examined through simulation analysis using an FDTD (Finite Difference Time Domain) method.

Figure 3A:
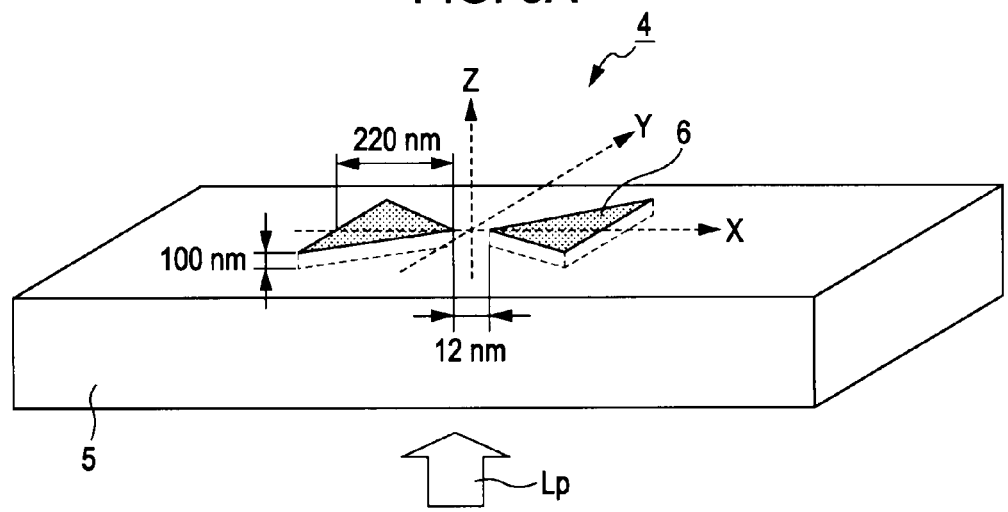
FIG. 3A shows the calculation conditions for simulation analysis according to the first embodiment.

FIG. 3A shows the conditions (materials and dimensions) for the simulation analysis. In the simulation analysis, the substrate 5 was formed from $SiO_2$, and the conductors 6 were formed from Au. The width W, the length L, and the thickness t of each conductor 6 were 440 nm, 220 nm, and 100 nm, respectively, and the size g of the gap between the pair of conductors 6 was 12 nm (also see FIG. 2). In the example, the midpoint between the pair of conductors 6 on the surface of the substrate 5 in which the conductors 6 were formed was used as the origin of a coordinate system with an X-axis, a Y-axis, and a Z-axis.

In the simulation analysis, the near-field light production section 4 was irradiated with propagation light Lp that had a wavelength of 780 nm and that had been linearly polarized in the X direction from the negative direction along the Z-axis. The information recording surface of a recording medium was disposed at a position of Z=+7 nm with an air layer between the conductors 6 and the information recording surface. Because the absolute value of the permittivity of the recording medium is sufficiently greater than the absolute value of the permittivity of the air layer, the Z-direction component of an electric field that enters the recording medium is significantly small in accordance with the boundary conditions imposed by Maxwell's equations. Therefore, the simulation analysis focused only on the X-direction component and the Y-direction component of the electric field at Z=+7 nm. The distance (7 nm) between the conductors 6 and the information recording surface set in the simulation is one of typical values that may currently be used to record information using near-field light.

Figure 3B:
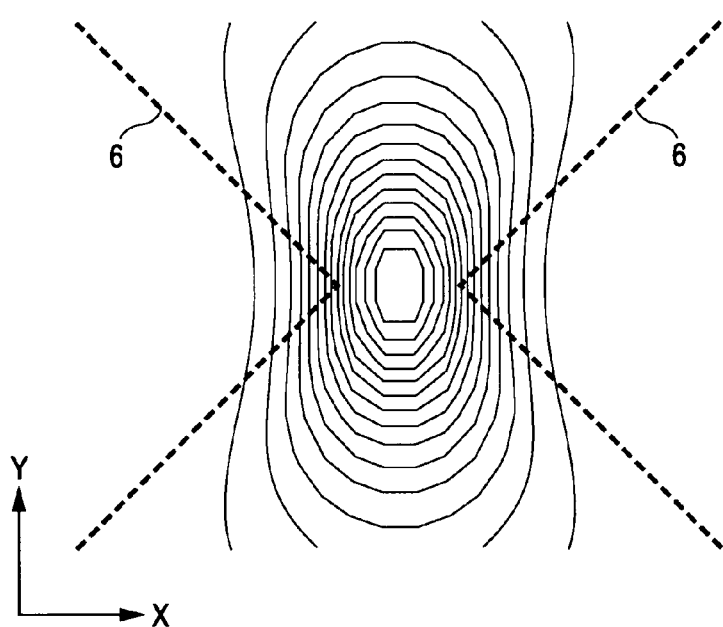
FIG. 3B shows the analysis results of the distribution of the intensity (field intensity) of near-field light.

FIG. 3B shows the results of the simulation analysis. The solid lines in FIG. 3B indicate the distribution of the X-direction component $|Ex|^2$ of the field intensity, and are so-called field intensity contour lines obtained by connecting points at the same field intensity. The intensity distribution indicates that the field intensity $|Ex|^2$ becomes greater toward the center of the field intensity contour lines. The thick broken lines in FIG. 3B indicate the opposing ends of the conductors 6.

As is clear from FIG. 3B, each field intensity contour line of the X-direction component $|Ex|^2$ of the field intensity is longer in the Y direction than in the X direction, and the intervals between the field intensity contour lines are also longer in the Y direction than in the X direction. From the above, it is found that with the shape and the arrangement of the two conductors 6 according to the embodiment, the effective size of light spots formed by near-field light produced between the pair of conductors 6 is smaller in the X direction (a direction from one of the pair of conductors 6 to the other of the pair of conductors 6) than in the Y direction.

[Configuration of Recording/Reproduction Apparatus and Recording/Reproduction System]

Figure 4:
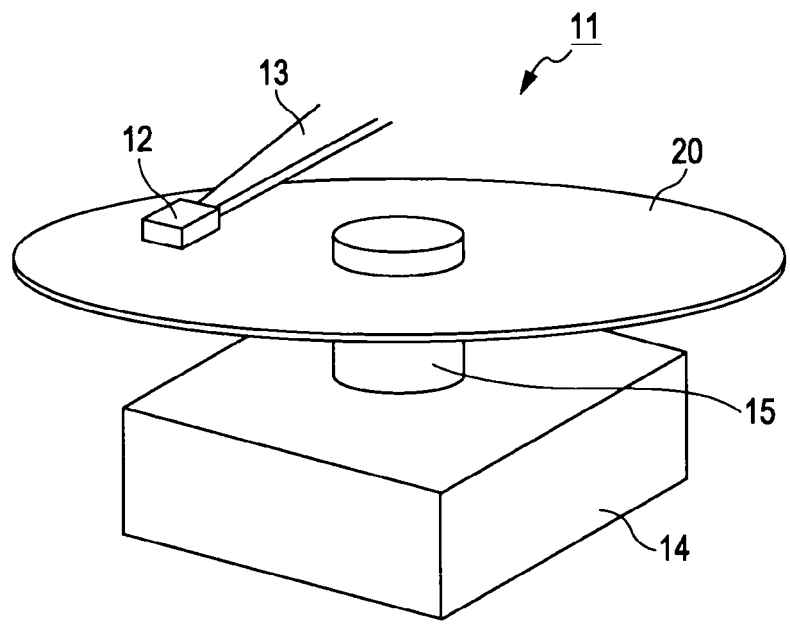
FIG. 4 shows a schematic configuration of a recording/reproduction system according to the first embodiment.

FIG. 4 shows an exemplary schematic configuration of a recording/reproduction system apparatus in which a recording medium is mounted on the recording/reproduction according to the embodiment. The recording/reproduction apparatus 11 mainly includes a floating slider head 12, a suspension 13 for supporting the floating slider head 12, and a spindle 14 for rotationally driving the recording medium 20. The recording medium 20 is fixed to a rotary shaft 15 of the spindle 14.

In the embodiment, the recording medium 20 is a disc-like medium, for example, with a recording layer (not shown) formed as a continuous film. The recording medium 20 may be a magneto-optical recording medium, a magnetic recording medium, a phase-change medium, or a dye medium, for example.

Figure 5:
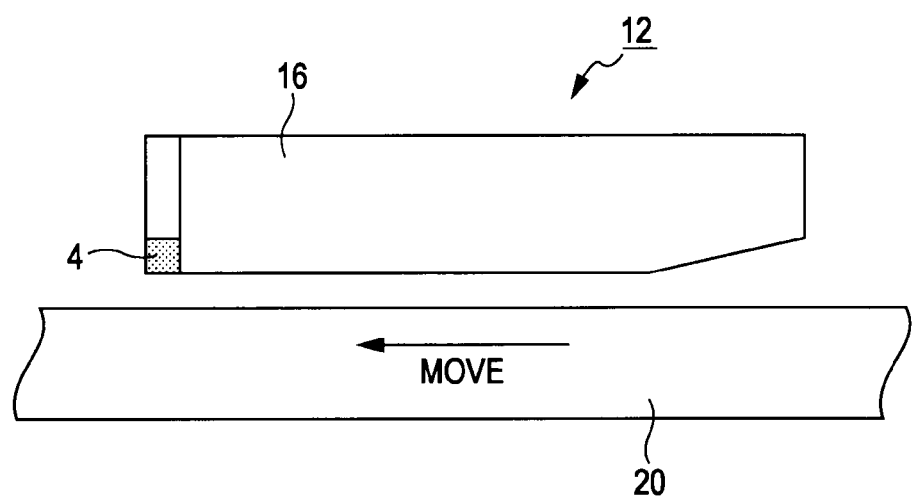
FIG. 5 schematically shows the boundary between a floating slider head and a recording medium during recording of information.

FIG. 5 shows an operation of the recording/reproduction system, that is, how the recording medium 20 is mounted on the recording/reproduction apparatus 11 according to the embodiment in order to record or reproduce information. In the embodiment, a floating slider head is used to record information on the recording medium 20. A slider main body 16 of the floating slider head 12 is disposed opposite the recording medium 20. The floating slider head 12 is adjusted such that the recording medium 20 moves with respect to the floating slider head 12 at a high speed with the slider main body 16 being made to float at a predetermined distance from the recording medium 20 by an elastic force of the suspension 13. For example, the gap between the recording medium 20 and the slider main body 16 is adjusted to 10 nm or less.

In the slider main body 16, the near-field light generation section 10 configured as shown in FIG. 1, for example, is installed with the near-field light production section 4 disposed opposite the recording medium 20. At this time, the surface of the near-field light production section 4 in which the pair of conductors 6 (not shown in FIG. 5) are formed is disposed opposite the recording medium 20. The light source 1 (not shown in FIG. 5) may be a semiconductor laser, for example, and light emitted from the light source 1 is directed to an area between the pair of conductors 6 of the near-field light production section 4 via a waveguide or the like. Consequently, near-field light is produced between the pair of conductors 6 to record information.

In the case where information recorded on a recording medium is to be reproduced optically, a recording head including the near-field light production section 4 may also be used as a reproduction head (an example of which is discussed in detail later in a modification 3), or a head exclusively for reproduction may be provided separately. In the case where information recorded on a recording medium is to be reproduced magnetically, a head exclusively for reproduction is provided separately from a recording head including the near-field light production section 4. Although a recording/reproduction apparatus capable of recording and reproducing information is described as an example in the embodiment, the present invention is not limited thereto, and a recording head including the near-field light generation section 10 shown in FIG. 1 may be applied to an information recording apparatus exclusively for recording information.

[Relationship between Arrangement of Conductors and Line Direction of Recording Medium]

Figure 6:
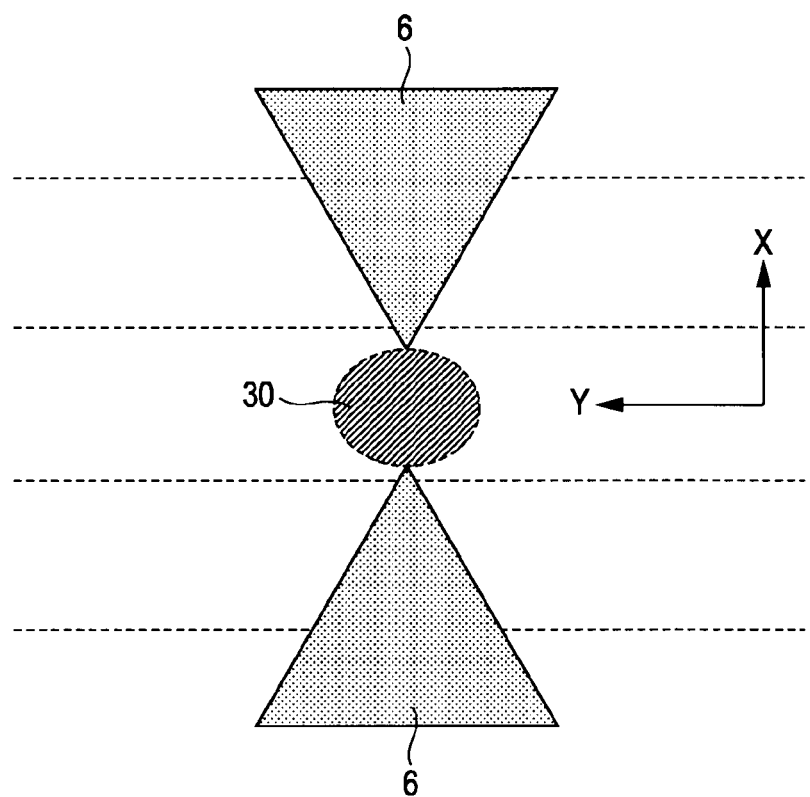
FIG. 6 shows the positional relationship between two conductors and the line direction of tracks.

FIG. 6 shows the positional relationship between the pair of conductors 6 of the near-field light production section 4 and the line direction (track direction) of the recording medium 20 during recording of information on the recording medium 20. The broken lines in FIG. 6 indicate the boundaries between tracks of a recording layer.

In the embodiment, the pair of conductors 6 are disposed such that a direction from one of the pair of conductors 6 to the other of the pair of conductors 6 of the near-field light production section 4 (X direction in FIG. 6) is generally perpendicular to the line direction (track direction) of the recording medium 20 (Y direction in FIG. 6) when information is recorded on the recording medium 20. With the pair of conductors 6 disposed in this way, it is possible to suppress the spread of near-field light 30 in a direction from one of the pair of conductors 6 to the other of the pair of conductors 6 (X direction in FIG. 6), that is, in the track pitch direction of the recording medium 20, as described in relation to FIG. 3. Consequently, adjacent tracks are not easily heated by the near-field light 30, preventing cross erasing of the adjacent tracks.

Thus, according to the embodiment, high-density recording is enabled in the track pitch direction of the recording medium 20 with a simple configuration. According to the embodiment, for example, high-density recording with 1 T/bit$^2$ or more is enabled with a track pitch of about 25 nm or less.

<2. Modification 1>

Although the pair of conductors 6 of the near-field light production section 4 are disposed in a bow-tie arrangement in the first embodiment, the present invention is not limited thereto, and the arrangement of the pair of conductors 6 may be modified appropriately in accordance with use, specifications, and ease of fabrication, for example. Exemplary modified arrangements of the pair of conductors 6 are described below.

<Modification 1-1>

Figure 7:
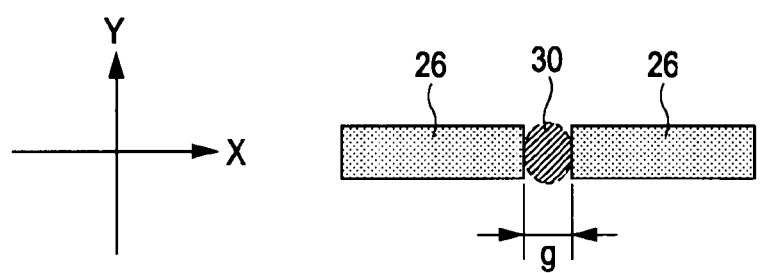
FIG. 7 shows a schematic configuration of a pair of conductors according to a modification 1-1.

FIG. 7 shows a top view of a pair of conductors disposed in accordance with a modification 1-1 (showing a surface opposing a recording medium). Two conductors 26 (conductor sections) according to the modification 1-1 are disposed in a so-called double rod arrangement. In the modification 1-1, respective surfaces of the two conductors 26 that oppose a recording medium have a rectangular shape that is the same for the two conductors 26. The conductors 26 are disposed such that one of the short sides of one conductor 26 opposes one of the short sides of the other. In the example of FIG. 7, the direction in which the respective short sides of the conductors 26 oppose each other (the direction along the long sides of the conductors 26) is defined as the X direction, the direction perpendicular to the X direction (the direction along the short sides of the conductors 26) is defined as the Y direction, and the direction of the thickness of the conductors 26 is defined as the Z direction.

The two conductors 26 are disposed such that a direction from one of the two conductors 26 to the other of the two conductors 26 matches the track pitch direction of the recording medium when information is recorded. The size g of the gap between the two conductors 26 is adjusted such that when an area between the two conductors 26 is irradiated with propagation light Lp from a light source, near-field light at a sufficient intensity is produced between the two conductors 26 and the spot size of the near-field light is in a range appropriate for recording information.

Also with the configuration according to the modification 1-1, the spread state and the intensity distribution of the near-field light 30 produced between the pair of conductors 26 were examined through simulation analysis using the FDTD method in the same way as in the first embodiment.

Figure 8A:
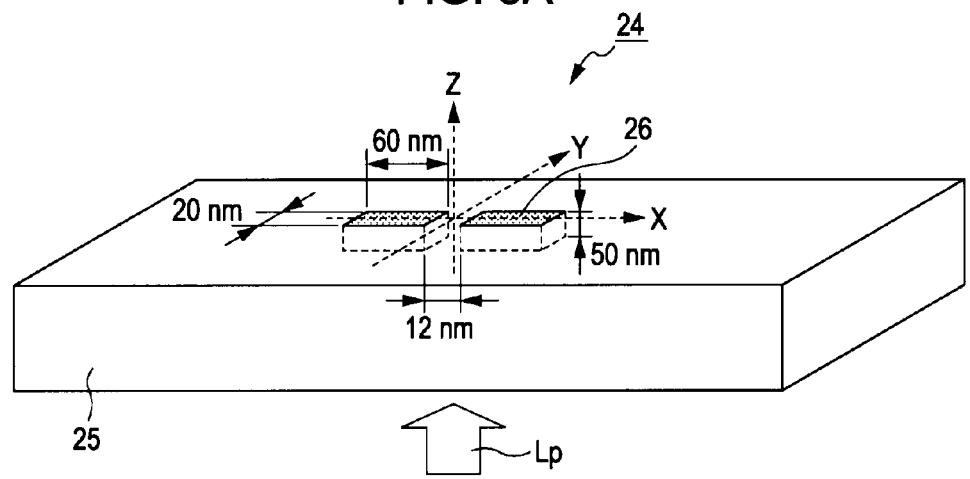
FIG. 8A shows the calculation conditions for simulation analysis according to the modification 1-1.

FIG. 8A shows the conditions (materials and dimensions) for the simulation analysis. In the simulation analysis, the substrate 25 was formed from $SiO_2$, and the conductors 26 were formed from Au. The width, the length, and the thickness of each conductor 26 were 20 nm, 60 nm, and 50 nm, respectively, and the size g of the gap between the pair of conductors 26 was 12 nm. Other simulation conditions were the same as in the first embodiment. Also in the example, the midpoint between the pair of conductors 26 on the surface of the substrate 25 in which the conductors 26 were formed was defined as the origin of a coordinate system with an X-axis, a Y-axis, and a Z-axis.

Figure 8B:
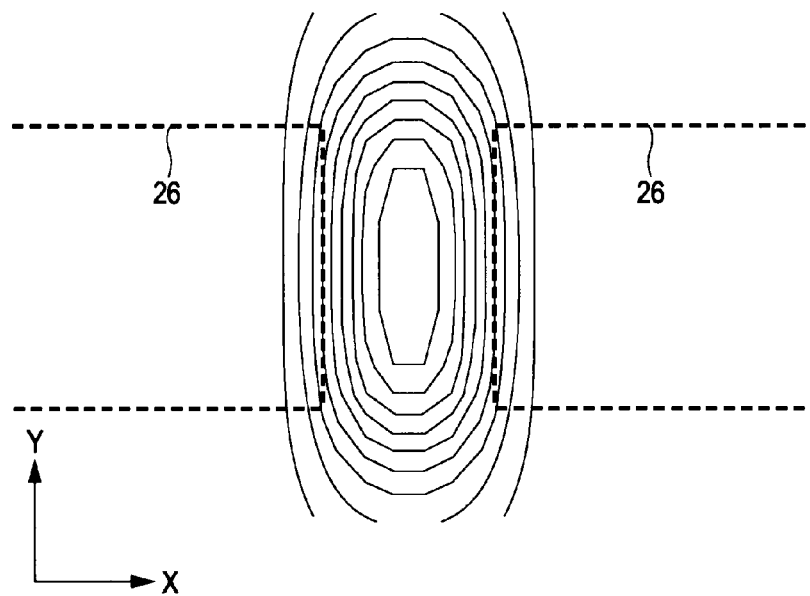
FIG. 8B shows the analysis results of the distribution of the intensity (field intensity) of near-field light.

FIG. 8B shows the results of the simulation analysis. The solid lines in FIG. 8B are field intensity contour lines that indicate the distribution of the X-direction component $|Ex|^2$ of the field intensity at a position of Z=+7 nm. The intensity distribution indicates that the field intensity $|Ex|^2$ becomes greater toward the center of the field intensity contour lines. The thick broken lines in FIG. 8B indicate the opposing ends of the conductors 26.

Also with the configuration according to the modification 1-1, as is clear from FIG. 8B, each field intensity contour line of the X-direction component $|Ex|^2$ of the field intensity is longer in the Y direction than in the X direction, and the intervals between the field intensity contour lines are also longer in the Y direction than in the X direction. From the above, it is found that also with the shape and the arrangement of the two conductors 26 according to the modification 1-1, the effective size of light spots formed by near-field light produced between the pair of conductors 26 is smaller in the X direction (a direction from one of the pair of conductors 26 to the other of the pair of conductors 26) than in the Y direction.

Thus, also with the configuration according to the modification 1-1, it is possible to suppress the spread of the near-field light 30 in the track pitch direction of the recording medium. This prevents cross erasing between adjacent tracks, and enables high-density recording in the track pitch direction of the recording medium as well.

<Modification 1-2>

Figure 9:
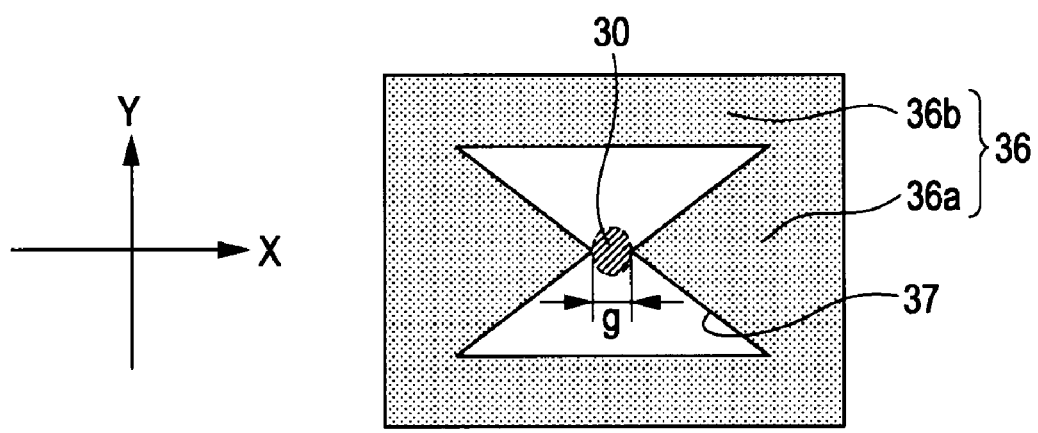
FIG. 9 shows a schematic configuration of a conductor according to a modification 1-2.

FIG. 9 shows a top view of a conductor according to a modification 1-2 (showing a surface opposing a recording medium). A conductor 36 according to the modification 1-2 is in a so-called bow-tie slot arrangement.

In the modification 1-2, an opening 37 in which no metal film is formed is formed in the center of the conductor 36. The two sides of the opening that oppose each other in the X direction in FIG. 9 project in a triangular (convex) shape toward each other, and the opposing sides are symmetrical with respect to the Y direction. Meanwhile, both the two sides of the opening 37 that oppose each other in the Y direction extend linearly in parallel to each other. That is, the bow-tie opening 37 is defined in the center of the conductor 36 by two triangular conductor sections 36a which define the sides of the opening 37 that oppose each other in the X direction, and two conductor connection sections 36b which define the sides of the opening 37 that oppose each other in the Y direction and which connect the two conductor sections 36a.

A direction from one of the two conductor sections 36a to the other of the two conductor sections 36a matches the track pitch direction of the recording medium when information is recorded. The size g of the gap between the two conductor sections 36a is adjusted appropriately such that when an area between the two conductor sections 36a is irradiated with propagation light Lp from a light source, near-field light at a sufficient intensity is produced between the two conductor sections 36a and the spot size of the near-field light is in a range appropriate for recording information.

Also with the configuration according to the modification 1-2, the spread state and the intensity distribution of the near-field light 30 produced between the pair of conductor sections 36a were examined through simulation analysis using the FDTD method in the same way as in the first embodiment.

Figure 10A:
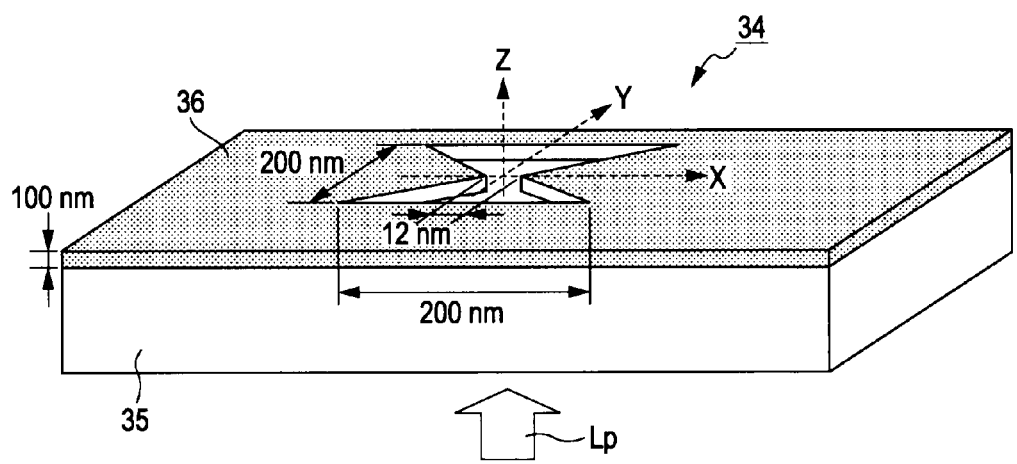
FIG. 10A shows the calculation conditions for simulation analysis according to the modification 1-2.

FIG. 10A shows the conditions (materials and dimensions) for the simulation analysis. In the simulation analysis, the substrate 35 was formed from $SiO_2$, and the conductors 36 were formed from Au. Both the widths of the bow-tie opening 37 in the X direction and the Y direction were 200 nm, the size g of the gap between the two conductor sections 36a was 12 nm, and the thickness of the conductor 36 was 100 nm. Other simulation conditions were the same as in the first embodiment. In the example, the midpoint between the pair of conductor sections 36a on the surface in which the conductor 36 was formed was defined as the origin of a coordinate system with an X-axis, a Y-axis, and a Z-axis.

Figure 10B:
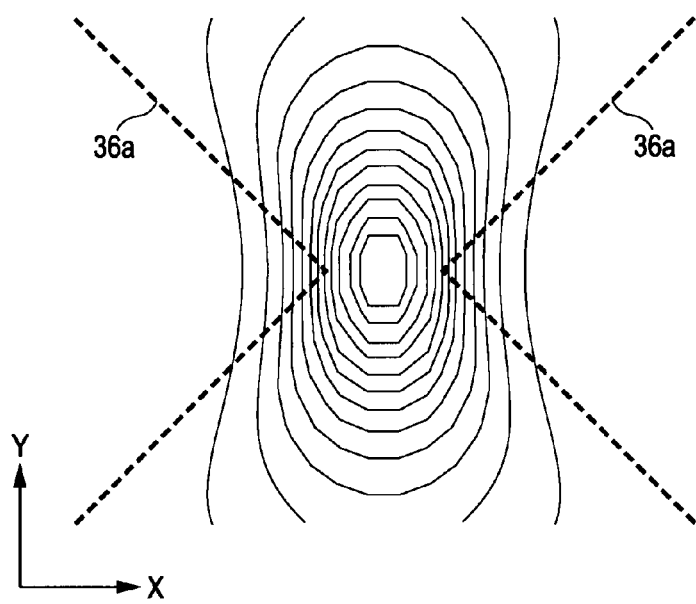
FIG. 10B shows the analysis results of the distribution of the intensity (field intensity) of near-field light.

FIG. 10B shows the results of the simulation analysis. The solid lines in FIG. 10B are field intensity contour lines that indicate the distribution of the X-direction component $|Ex|^2$ of the field intensity at a position of Z=+7 nm. The intensity distribution indicates that the field intensity $|Ex|^2$ becomes greater toward the center of the field intensity contour lines. The thick broken lines in FIG. 10B indicate the opposing ends of the conductor sections 36a.

Also with the configuration according to the modification 1-2, as is clear from FIG. 10B, each field intensity contour line of the X-direction component $|Ex|^2$ of the field intensity is longer in the Y direction than in the X direction, and the intervals between the field intensity contour lines are also longer in the Y direction than in the X direction. From the above, it is found that also with the conductor 36 in a bow-tie slot arrangement according to the modification 1-2, the effective size of light spots formed by near-field light produced between the pair of conductor sections 36a is smaller in the X direction than in the Y direction.

Thus, also with the configuration according to the modification 1-2, it is possible to suppress the spread of the near-field light 30 in the track pitch direction of the recording medium. This prevents cross erasing between adjacent tracks, and enables high-density recording in the track pitch direction of the recording medium as well.

<Modification 1-3>

Figure 11:
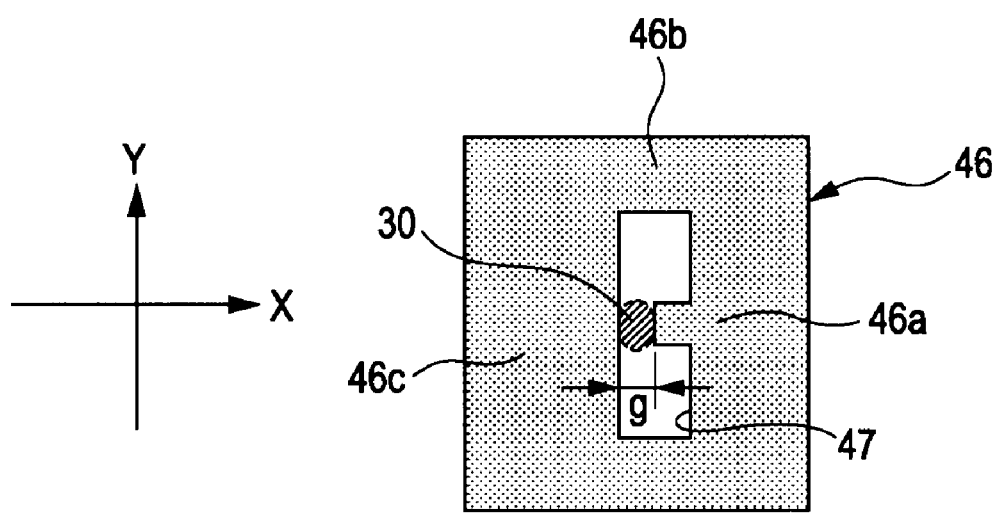
FIG. 11 shows a schematic configuration of a conductor according to a modification 1-3.

FIG. 11 shows a top view of a conductor according to a modification 1-3 (showing a surface opposing a recording medium). A conductor 46 according to the modification 1-3 is in a so-called C-aperture arrangement.

In the modification 1-3, an opening 47 in which no metal film is formed is formed in the center of the conductor 46. One of the sides of the opening 47 that oppose each other in the X direction in FIG. 11 projects in a convex shape toward the other, which extends linearly. Meanwhile, both the two sides of the opening 47 that oppose each other in the Y direction extend linearly in parallel to each other. That is, the C-shaped opening 47 is defined in the center of the conductor 46 by two conductor sections 46a and 46c which define the two sides of the opening 47 that oppose in the X direction, and two conductor connection sections 46b which define the two sides of the opening 47 that oppose in the Y direction and which connect the two conductor sections 46a and 46c.

A direction from one of the two conductor sections 46a and 46c to the other of the two conductor sections 46a and 46c matches the track pitch direction of the recording medium when information is recorded. The size g of the gap between the two conductor sections 46a and 46c is adjusted appropriately such that when an area between the two conductor sections 46a and 46c is irradiated with propagation light Lp, near-field light at a sufficient intensity is produced between the two conductor sections 46a and 46c. The size g of the gap between the two conductor sections 46a and 46c is adjusted appropriately such that the spot size of the near-field light is in a range appropriate for recording information.

Also with the configuration according to the modification 1-3, the spread state and the intensity distribution of the near-field light 30 produced between the two conductor sections 46a and 46c were examined through simulation analysis using the FDTD method in the same way as in the first embodiment.

Figure 12A:
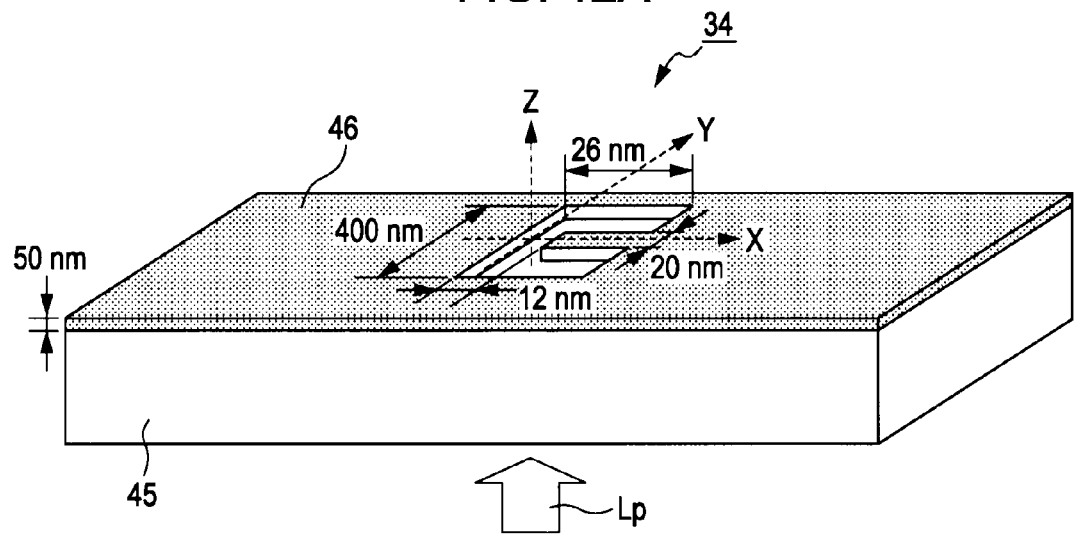
FIG. 12A shows the calculation conditions for simulation analysis according to the modification 1-3.

FIG. 12A shows the conditions (materials and dimensions) for the simulation analysis. In the simulation analysis, the substrate 45 was formed from $SiO_2$, and the conductors 46 were formed from Au. Both the widths of the C-shaped opening 47 in the X direction and the Y direction were 26 nm and 400 nm, respectively, and the width of the convex portion of the conductor section 46a was 20 nm. The size g of the gap between the two conductor sections 46a and 46c was 12 nm, and the thickness of the conductor 46 was 50 nm. Other simulation conditions were the same as in the first embodiment. In the example, the midpoint between the two conductor sections 46a and 46c on the surface in which the conductor 46 was formed was defined as the origin of a coordinate system with an X-axis, a Y-axis, and a Z-axis.

Figure 12B:
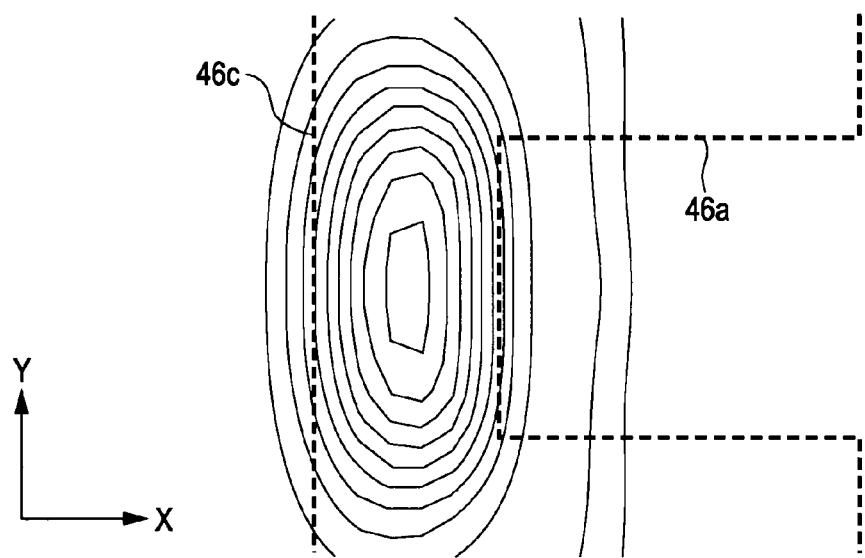
FIG. 12B shows the analysis results of the distribution of the intensity (field intensity) of near-field light.

FIG. 12B shows the results of the simulation analysis. The solid lines in FIG. 12B are field intensity contour lines that indicate the distribution of the X-direction component $|Ex|^2$ of the field intensity at a position of $Z=+7$ nm. The intensity distribution indicates that the field intensity $|Ex|^2$ becomes greater toward the center of the field intensity contour lines. The thick broken lines in FIG. 12B indicate the opposing portions of the two conductor sections 46a and 46c.

Also with the configuration according to the modification 1-3, as is clear from FIG. 12B, each field intensity contour line of the X-direction component $|Ex|^2$ of the field intensity is longer in the Y direction than in the X direction, and the intervals between the field intensity contour lines are also longer in the Y direction than in the X direction. From the above, it is found that also with the conductor 46 in a C-aperture arrangement according to the modification 1-3, the effective size of light spots formed by near-field light produced between the two conductor sections 46a and 46c is smaller in the X direction than in the Y direction.

Thus, also with the configuration according to the modification 1-3, it is possible to suppress the spread of the near-field light 30 in the track pitch direction of the recording medium. This prevents cross erasing between adjacent tracks, and enables high-density recording in the track pitch direction of the recording medium as well.

<3. Modification 2>

Although the recording layer of the recording medium 20 is formed as a continuous film in the first embodiment, the present invention is not limited thereto. For example, the present invention may also be applied to a recording medium with independent recording tracks and a recording medium with nano-sized recording mark regions formed independently.

Figure 13:
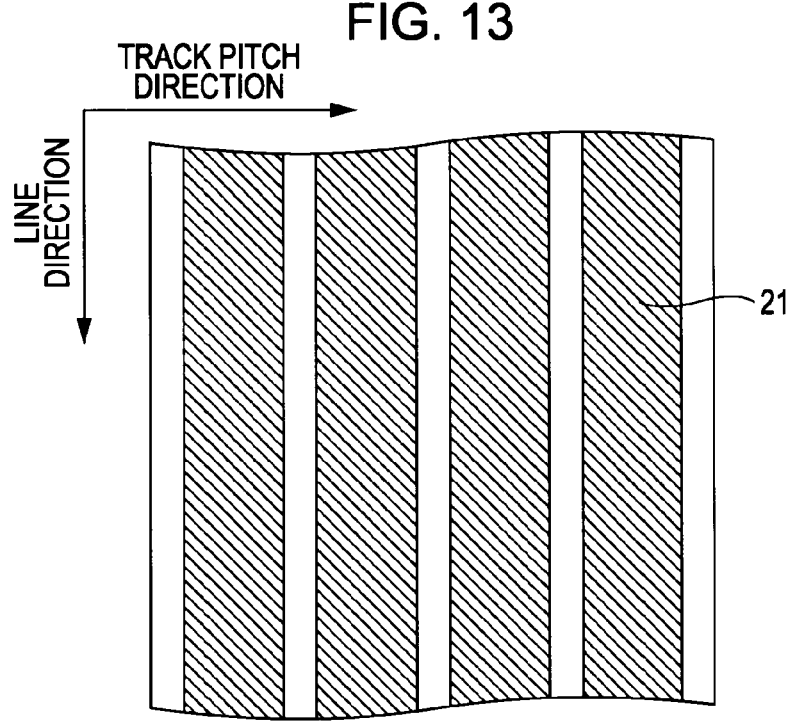
FIG. 13 shows a schematic configuration of a recording layer of a recording medium according to a modification 2.

FIG. 13 shows an exemplary schematic configuration of a recording medium with independent recording tracks. FIG. 13 is an enlarged top view of a portion of a recording layer. In the recording medium with independent recording tracks, recording tracks 21 are formed from a predetermined recording material. In respect to the line direction, each recording track 21 is formed as a continuous film with a predetermined width. In respect to the direction (track pitch direction) perpendicular to the line direction, meanwhile, the adjacent recording tracks 21 are formed separately from each other. Although the recording tracks 21 are linear tracks in the example of FIG. 13, the present invention is not limited thereto, and the recording tracks 21 may be meandering (wobbled) tracks.

In the case where the recording tracks 21 are formed from a magnetic material, that is, in the case where the recording medium is a so-called discrete medium, for example, it is possible to suppress magnetic interference between the adjacent recording tracks 21, reducing noise in a reproduced signal.

Figure 14:
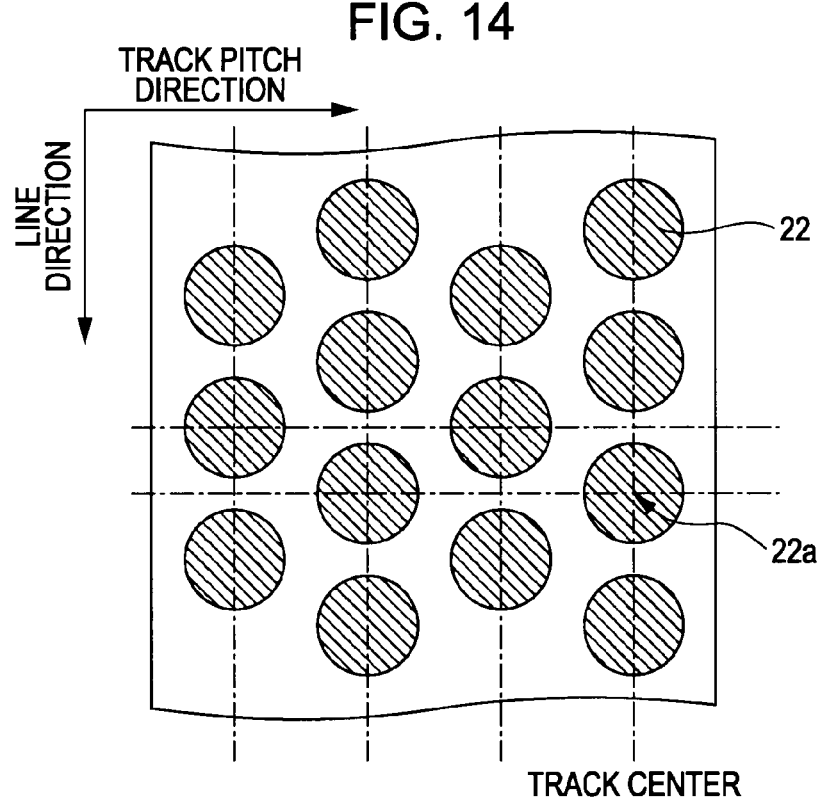
FIG. 14 shows a schematic configuration of a recording layer of a recording medium according to the modification 2.

FIG. 14 shows an exemplary schematic configuration of a recording medium with recording mark regions formed separately from each other. FIG. 14 is an enlarged top view of a portion of a recording layer. In the recording medium shown in FIG. 14, recording mark regions 22 (hereinafter simply referred to as "recording marks") are formed from a predetermined recording material, and are disposed separately at predetermined intervals in the line direction and the track pitch direction of the recording medium. One recording mark stores information of 1 bit. Although each recording mark 22 is formed in a circular shape as viewed from top in the example of FIG. 14, the present invention is not limited thereto, and each recording mark 22 may be formed in any shape. For example, each recording mark 22 may be formed in an oval or polygonal shape.

In the example of FIG. 14, the center 22a of each recording mark 22 in a track is displaced from the center 22a of each recording mark 22 in an adjacent track in the track pitch direction. The present invention is not limited thereto, and the center 22a of each recording mark 22 in a track is aligned with the center 22a of each recording mark 22 in an adjacent track in the track pitch direction. In the case where the center 22a of each recording mark 22 in a track is displaced from the center 22a of each recording mark 22 in an adjacent track in the track pitch direction as in the example of FIG. 14, it is possible to further reduce the track pitch.

In the case where the recording marks 22 are formed from a magnetic material, that is, in the case where the recording medium is a so-called patterned medium, for example, it is possible to address the problem of heat fluctuation during high-density recording, allowing recorded information to be held stably.

Also with the recording media configured as shown in FIGS. 13 and 14, it is possible to obtain the same effect as with the first embodiment and the modifications described above by disposing two conductors (or conductor sections) that produce near-field light such that a direction from one of the two conductors (or conductor sections) to the other of the two conductors (or conductor sections) is generally perpendicular to the line direction of a recording layer when information is recorded.

<4. Modification 3>

Although the near-field light generation section 10 which produces near-field light is installed in a recording head in the first embodiment, the present invention is not limited thereto. In the case where information recorded on a recording medium is to be reproduced optically, a recording head including the near-field light generation section 10 may also be used as a reproduction head. An example of such a configuration is described in a modification 3.

Figure 15:
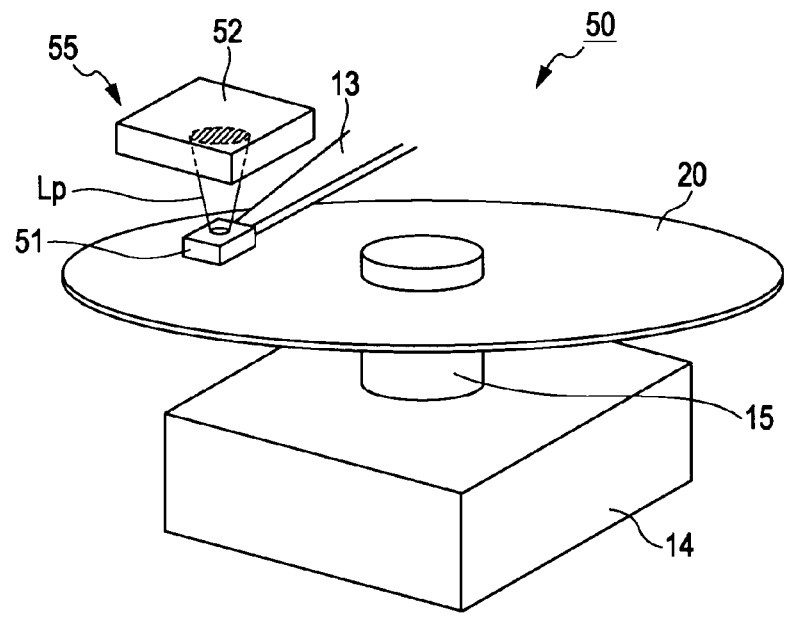
FIG. 15 shows a schematic configuration of a recording/reproduction system according to a modification 3.

FIG. 15 shows an exemplary schematic configuration of a recording/reproduction system in which a recording medium is mounted on a recording/reproduction apparatus according to the modification 3. In FIG. 15, the same components as those in the first embodiment (FIG. 4) are denoted by the same reference numerals. A recording/reproduction apparatus 50 according to the modification 3 is the same as the recording/reproduction apparatus in the first embodiment except for the configuration of a recording/reproduction head 55 that records and reproduces information.

Figure 16:
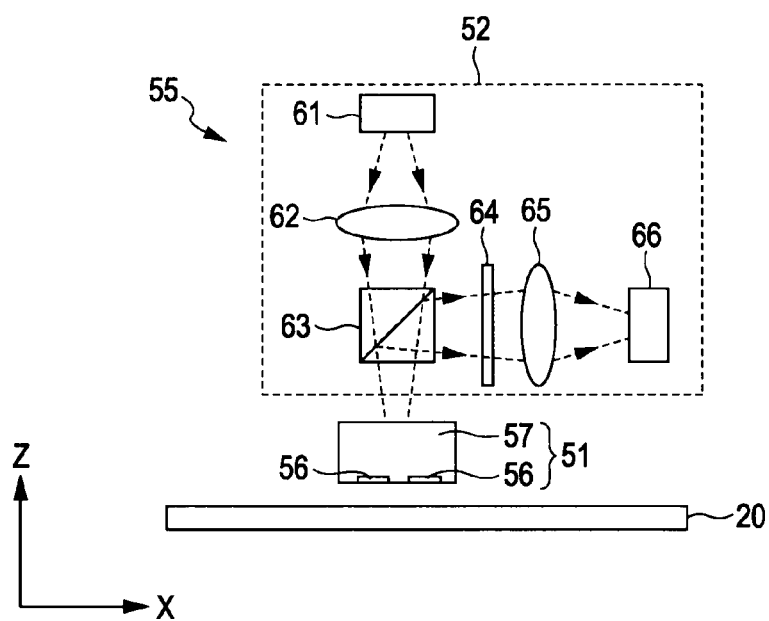
FIG. 16 shows a schematic configuration of a recording/reproduction head according to the modification 3.

FIG. 16 shows an exemplary schematic configuration of the recording/reproduction head 55. In the modification 3, the recording/reproduction head 55 includes a floating slider section 51 supported by a suspension 13, and an optical system 52 that irradiates the floating slider section 51 with propagation light Lp. The floating slider section 51 and the optical system 52 may be formed integrally with each other to be supported by the suspension 13.

The floating slider section (near-field light production section) 51 includes an optically transparent substrate 57 and a pair of conductors 56 formed in one surface of the substrate 57. The shape and the arrangement of the pair of conductors 56 are the same as in the first embodiment (see FIG. 2). The floating slider section 51 is disposed such that the surface in which the pair of conductors 56 are formed opposes the recording medium 20. The floating slider section 51 is controlled such that the recording medium 20 moves with respect to the floating slider section 51 at a high speed with the floating slider section 51 being made to float at a predetermined distance from the recording medium 20 by an elastic force of the suspension 13. Propagation light Lp from the optical system 52 is incident on the other surface of the substrate 57, in which no conductors 56 are formed, to produce near-field light between the pair of conductors 56.

Also in the modification 3, the pair of conductors 56 are disposed such that a direction from one of the pair of conductors 56 to the other of the pair of conductors 56 of the floating slider section 51 (X direction in FIG. 16) is perpendicular to the line direction (track direction) of the recording medium 20 (the direction perpendicular to the sheet surface of FIG. 16) when information is recorded on the recording medium 20.

The optical system 52 includes a recording system that records information on the recording medium 20. The recording system mainly includes a light source 61, and a condensing element 62 including a condensing lens etc. and a beam splitter 63 disposed in the path of light emitted from the light source 61. The light emitted from the light source 61 in incident on the floating slider section 51 via the condensing element 62 and the beam splitter 63. The incident light produces near-field light between the pair of conductors 56 to form a minute recording mark at a predetermined position in a recording track of the recording medium 20. At this time, a direction from one of the pair of conductors 56 to the other of the pair of conductors 56 is perpendicular to the line direction of the recording medium 20. This prevents cross erasing between adjacent tracks, and enables high-density recording in the track pitch direction of the recording medium 20.

The optical system 52 also includes a reproduction system that reproduces information from light reflected from the recording medium 20. The reproduction system mainly includes a polarizer 64, a condensing element 65, and a light reception section 66. The polarizer 64, the condensing element 65, and the light reception section 66 are disposed in this order from the beam splitter 63 side. The light reflected from the recording medium 20 is split by the beam splitter 63 into light to be incident on the floating slider section 51 and light to be incident on the polarizer 64. The light incident on the polarizer 64 is then incident on the light reception section 66 via the condensing element 65. Then, information is reproduced on the basis of the reflected light incident on the light reception section 66.

Although a floating slider head is used in the modification 3 and the first embodiment, the present invention is not limited thereto, and the height of a head may be controlled using an actuator or the like.

<5. Second Embodiment>

With the near-field light generation section of the recording/reproduction apparatus described in the first embodiment, it is possible to produce strong near-field light by reducing the size of the gap between the pair of conductors to be sufficiently smaller than the wavelength of propagation light emitted from the light source. Varying the size of the gap between the pair of conductors also varies the shape of near-field light to be produced and the intensity of near-field light to be irradiated to the recording medium. In order to irradiate the recording medium with near-field light at a higher intensity and with a higher efficiency to record information, it is necessary to optimally adjust the relationship between the size of the gap between the pair of conductors and the distance between the recording head and the recording medium. Thus, in a second embodiment, a description is made of the recording/reproduction apparatus and the recording/reproduction system according to the first embodiment in which the relationship described above is optimized.

[Configuration of Recording/Reproduction Apparatus]

Figure 17A:
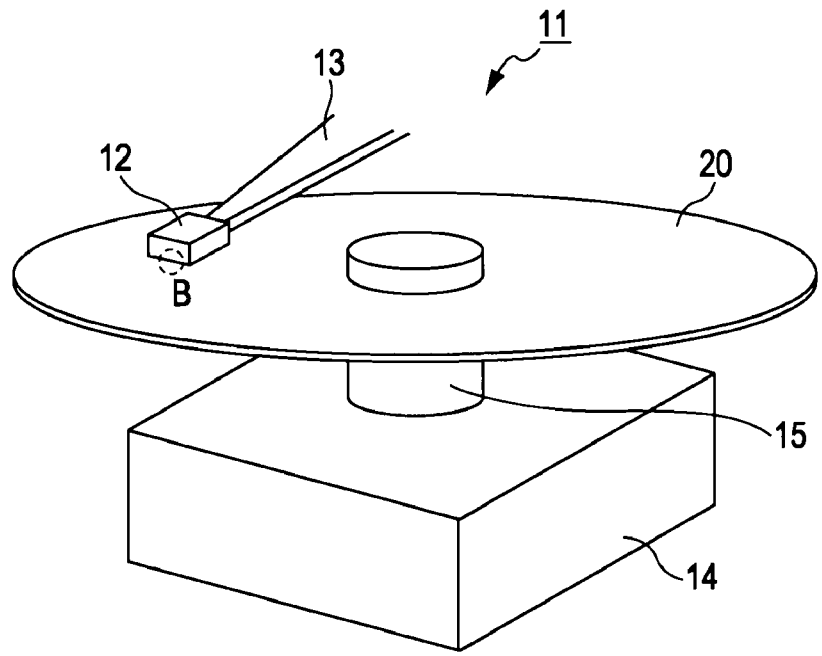
FIG. 17A shows a schematic configuration of a recording/reproduction system according to a second embodiment.

FIG. 17A shows an exemplary schematic configuration of a recording/reproduction system in which a recording medium is mounted on a recording/reproduction apparatus according to the embodiment to record information. In FIG. 17A, the same components as those in the first embodiment (FIG. 4) are denoted by the same reference numerals.

As is clear from the comparison between FIG. 17A and FIG. 4 (first embodiment), the configuration of the recording/reproduction system in which a recording medium is mounted on a recording/reproduction apparatus according to the embodiment is the same as in the first embodiment. In the embodiment, the relationship between the size of the gap between the pair of conductors and the distance between the recording head and the recording medium during recording of information is optimized. Therefore, the following describes the relationship between the size of the gap between the pair of conductors and the distance between the recording head and the recording medium during recording of information, and not the configuration of each of the recording/reproduction apparatus and the recording/reproduction system. In the embodiment, the shape and the arrangement of the conductors are also the same as in the first embodiment (see FIG. 2).

Figure 17B:
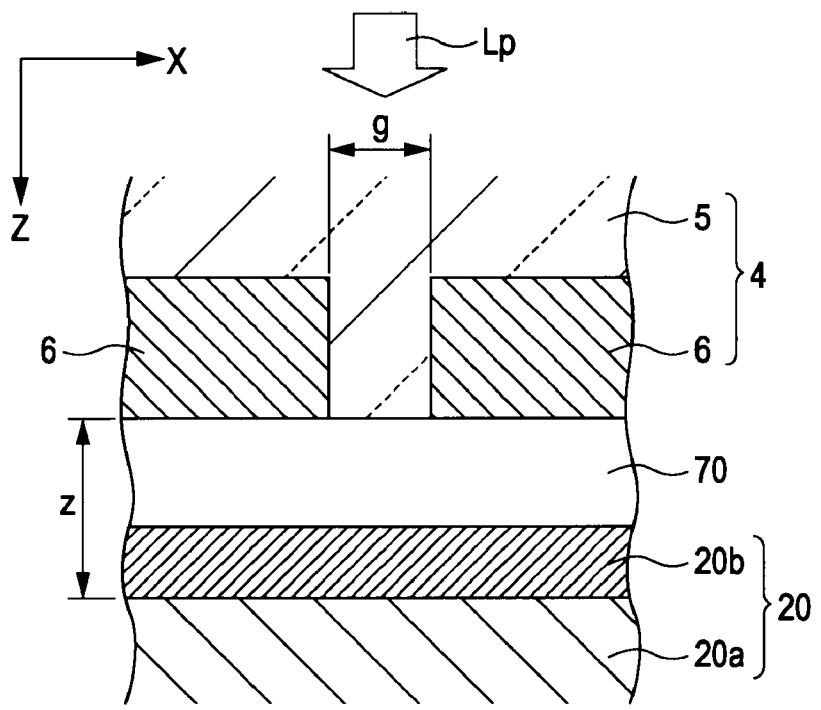
FIG. 17B is an enlarged cross-sectional view of a region B surrounded by the dashed line in FIG. 17A.

FIG. 17B is an enlarged cross-sectional view of a region B surrounded by the dashed line in FIG. 17A. In the example of FIG. 17B, a protection film 20*b* (for example, a diamond-like carbon film) is formed over a recording layer 20*a* of the recording medium 20.

In the embodiment, the near-field light production section 4, which is installed in the floating slider head 12, is disposed such that the surface of the near-field light production section 4 in which the conductors 6 are formed opposes the protection film 20*b* of the recording medium 20 via an air layer 70. When information is recorded, a direction from one of the pair of conductors 6 to the other of the pair of conductors 6 (X direction in FIG. 17B) is generally perpendicular to the line direction of the recording medium 20 (the direction perpendicular to the sheet surface of FIG. 17B) as in the first embodiment.

In the embodiment, the floating distance of the floating slider head 12 is adjusted (controlled) such that the size g of the gap between the pair of conductors 6 and the distance z between the conductors 6 and the recording layer 20*a* at the time when information is recorded (at the time when the floating slider head 12 is floated stably) satisfy the following formula 1:

$$g = \sqrt{2} \cdot z \quad \text{[Formula 1]}$$

In the case where the relationship of the formula 1 is satisfied when information is recorded, the field intensity of near-field light with which the recording layer 20*a* is irradiated becomes maximum, allowing efficient irradiation of the recording medium 20 with near-field light. The principle for deriving the formula 1 is described below with reference to FIGS. 18 to 20.

Figure 18:
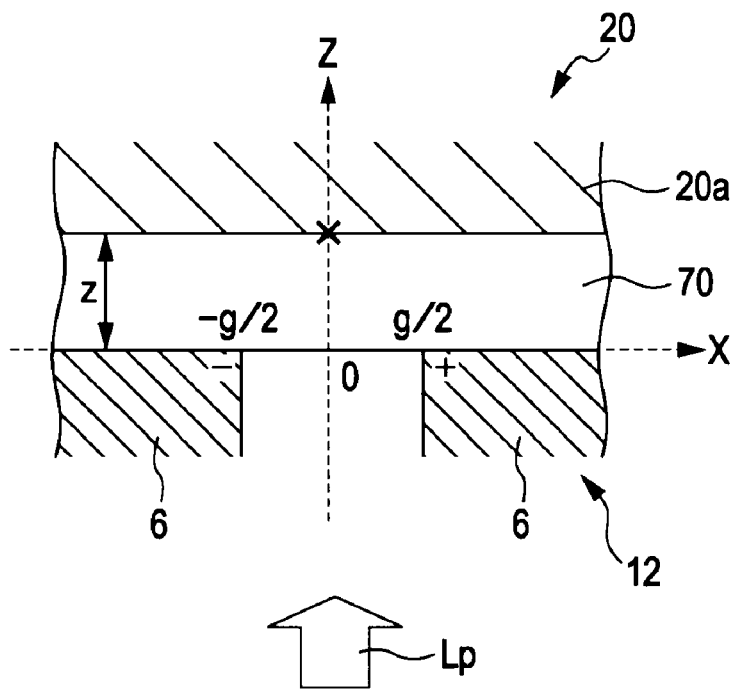
FIG. 18 illustrates an optimum relationship between the size of a gap between two conductors and the distance between the conductors and a recording layer.

FIG. 18 shows an enlarged cross-sectional view of a region in which the floating slider head 12 and the recording medium 20 oppose each other when information is recorded. In FIG. 18, the protection film 20*b* of the recording medium 20 is not shown for simplicity of illustration. Also in FIG. 18, the vertical positional relationship between the floating slider head 12 and the recording medium 20 is inverted compared to FIG. 17B for convenience of description of the principle for deriving the formula 1. In FIG. 18, the midpoint between the surfaces of the two conductors 6 is defined as the origin (the point indicated by "0" in FIG. 18) of a coordinate system with X direction (a direction from one of the two conductors 6 to the other of the two conductors 6), Y direction (the direction perpendicular to the sheet surface of FIG. 18), and Z direction (the height direction).

A consideration is given of a case where a positive charge is induced near the surface of the conductor 6 disposed in the +X direction at a position of X=+g/2 and a negative charge is induced near the surface of the conductor 6 disposed in the −X direction at a position of X=−g/2 at a certain moment during recording of information as shown in FIG. 18. The light source irradiates the pair of conductors 6 with propagation light Lp at a high frequency. Therefore, the polarity of the charges induced near the surfaces of the conductors 6 at positions of X=±g/2 alternates between positive and negative at the frequency of the propagation light Lp with which an area between the pair of conductors 6 is irradiated.

In the state of FIG. 18, each induced charge is spread over the surfaces of the conductors 6 in a finite, minute region. Therefore, the region of each induced charge may be equivalently represented by a point charge. That is, the example of FIG. 18 is equivalent to a case where positive and negative point charges are disposed on the surfaces of the conductors 6 at positions of X=+g/2 and X=−g/2, respectively, in place of the conductors 6.

Figure 19:
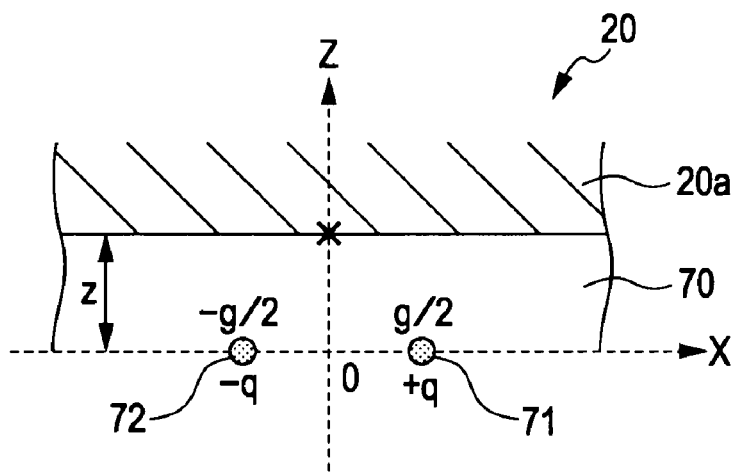
FIG. 19 illustrates an optimum relationship between the size of a gap between two conductors and the distance between the conductors and a recording layer.

FIG. 19 schematically shows the case where the induced charges of FIG. 18 are equivalently represented by point charges. The state shown in FIG. 18 is equivalent to a state in which a point charge 71 of +q is disposed at a position (X, Y, Z)=(+g/2, 0, 0) and a point charge 72 of −q is disposed at a position (X, Y, Z)=(−g/2, 0, 0). In the example of FIG. 19, the amount of charge induced on the surface of each conductor 6 is defined as q.

An optimum relationship between the size g of the gap between the conductors 6 and the distance z between the recording medium 20 and the floating slider head 12 represented by the formula 1 is calculated below using the configuration shown in FIG. 19. The region for consideration of near-field light is sufficiently smaller than the wavelength of the propagation light Lp from the light source. Thus, calculation is performed with electrostatic approximation on the assumption that no phase delay of electromagnetic waves occurs in the region.

Components Ex, Ey, and Ez of the electric field (near-field light) in respective directions at a position (X, Y, Z)=(x, y, z) produced by the point charge 71 (+q) and the point charge 72 (−q) are represented by the following formula 2, in which $\epsilon_0$ is the permittivity of an area (the air layer 70) around the point charges 71 and 72:

X-direction component: $E_x =$  [Formula 2]

$$\frac{q}{8 \cdot \pi \cdot \varepsilon_0} \cdot \left( \frac{2x - g}{\left(x^2 - xg + \frac{1}{4}g^2 + y^2 + z^2\right)^{3/2}} - \frac{2x + g}{\left(x^2 + xg + \frac{1}{4}g^2 + y^2 + z^2\right)^{3/2}} \right)$$

Y-direction component: $E_y =$ $$\frac{q}{4 \cdot \pi \cdot \varepsilon_0} \cdot \left( \frac{y}{\left(x^2 - xg + \frac{1}{4}g^2 + y^2 + z^2\right)^{3/2}} - \frac{y}{\left(x^2 + xg + \frac{1}{4}g^2 + y^2 + z^2\right)^{3/2}} \right)$$

Z-direction component: $E_z =$ $$\frac{q}{4 \cdot \pi \cdot \varepsilon_0} \cdot \left( \frac{z}{\left(x^2 - xg + \frac{1}{4}g^2 + y^2 + z^2\right)^{3/2}} - \frac{z}{\left(x^2 + xg + \frac{1}{4}g^2 + y^2 + z^2\right)^{3/2}} \right)$$

Components of the electric field in respective directions in the air layer 70 are defined as $E_{x0}$, $E_{y0}$, and $E_{z0}$, and components of the electric field in respective directions in the recording layer 20*a* (target of irradiation with near-field light) are defined as $E_{x1}$, $E_{y1}$, and $E_{z1}$. Further, the permittivity of the recording layer 20*a* is defined as $\epsilon_1$, and the boundary surface between the air layer 70 and the recording layer 20*a* is assumed to be parallel to the XY plane. Then, according to the boundary conditions imposed by Maxwell's equations, the following formula 3 is satisfied at the boundary surface:

$$E_{x0} = E_{x1} \quad \text{[Formula 3]}$$
$$E_{y0} = E_{y1}$$

-continued $$E_{z0} = \frac{\varepsilon_1}{\varepsilon_2} E_{z1}$$

The first and second equations in the formula 3 indicate that the electric field components $E_x$ and $E_y$, which are parallel to the boundary surface, are continuous on the boundary between different media. The third equation in the formula 3 indicates that the electric field component $E_z$, which is perpendicular to the boundary surface, is discontinuous on the boundary between different media.

A consideration is given of a case where information is to be recorded at a position (X, Y, Z)=(0, 0, z) (the position indicated by the x mark in FIGS. 18 and 19) on the recording layer 20a opposite the midpoint (origin) between the conductors 6. In this case, the Y-direction component $E_y$ and the Z-direction component $E_z$ of the electric field are both 0 (zero) in the formula 2. Meanwhile, the X-direction component $E_x$ is represented by the following formula 4:

$$E_x = -\frac{q}{4 \cdot \pi \cdot \varepsilon_0} \cdot \frac{g}{\left(\frac{1}{4}g^2 + z^2\right)^{3/2}} \quad \text{[Formula 4]}$$

From the formula 4, conditions that maximize the field intensity, that is, the intensity of the near-field light, at the information recording position (X, Y, Z)=(0, 0, z) are obtained. At the recording position, only the X-direction component $E_x$ of the electric field represented by the formula 4 is produced. As indicated by the formula 3, the X-direction component $E_x$ of the electric field is continuous at the boundary surface between the air layer 70 and the recording layer 20a without being affected by the difference in the permittivity between the inside and the outside of the boundary surface. Therefore, the permittivity $\varepsilon_0$ of the air layer 70 in the formula 4 may be considered as a constant. As a result, the formula 4 may be converted into the following formula 5, in which A is a constant:

$$E_x = A \cdot \frac{g}{\left(\frac{1}{4}g^2 + z^2\right)^{3/2}} \quad \text{[Formula 5]}$$

A variable portion on the right side of the formula 5, namely, the portion on the right side except the constant A, is represented by f. That is, the variable f is represented by the following formula 6:

$$f = \frac{g}{\left(\frac{1}{4}g^2 + z^2\right)^{3/2}} \quad \text{[Formula 6]}$$

Figure 20:
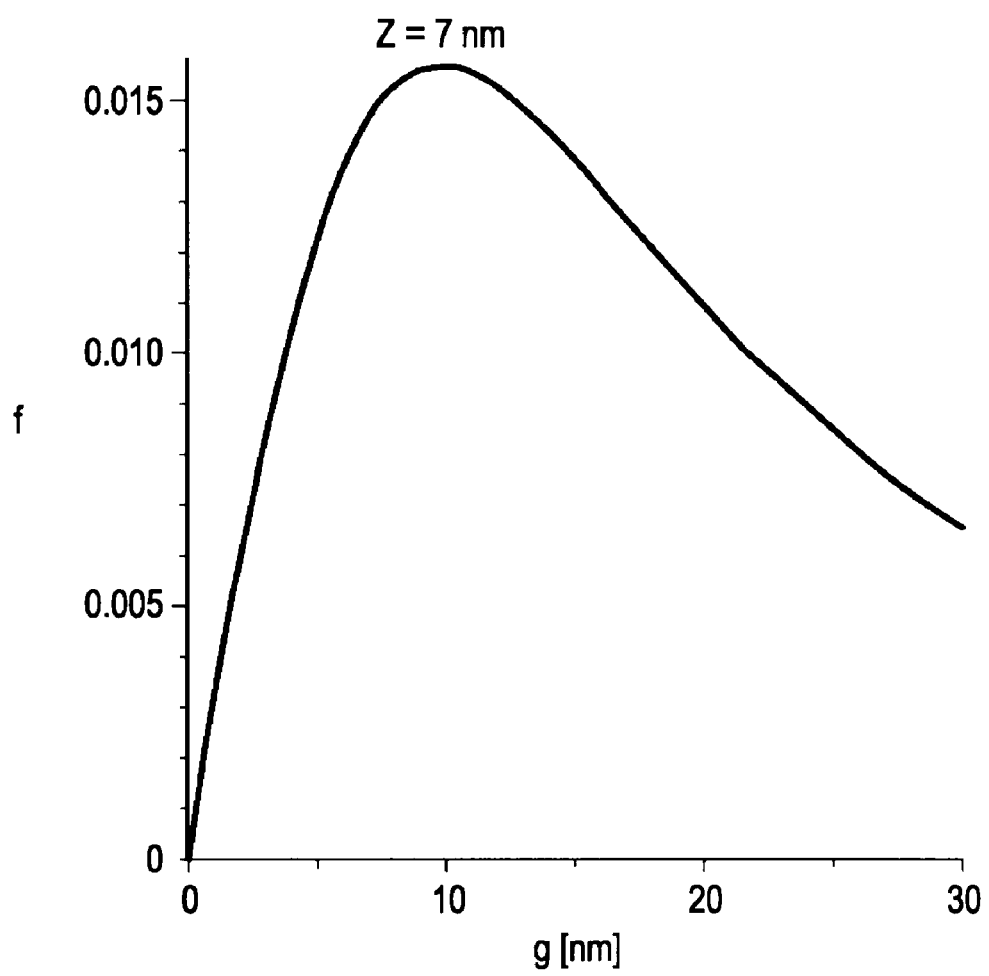
FIG. 20 shows a relationship between the field intensity at Z=7 nm and the size g of a gap between conductors.

In the case of z=7 nm in the formula 6, that is, in the case where the distance between the recording layer 20a and the conductors 6 is 7 nm, the variable f varies with respect to the size g of the gap between the conductors 6 as shown in FIG. 20. As is clear from FIG. 20, the variable f becomes maximum at a predetermined gap size g, and the field intensity (intensity of near-field light) also becomes maximum with the variable f at its maximum value.

The conditions that maximize the variable f are obtained by solving df/dg=0 in the formula 6, which results in the following formula 7:

$$g = \sqrt{2} \cdot z \quad \text{[Formula 7]}$$

Figure 21:
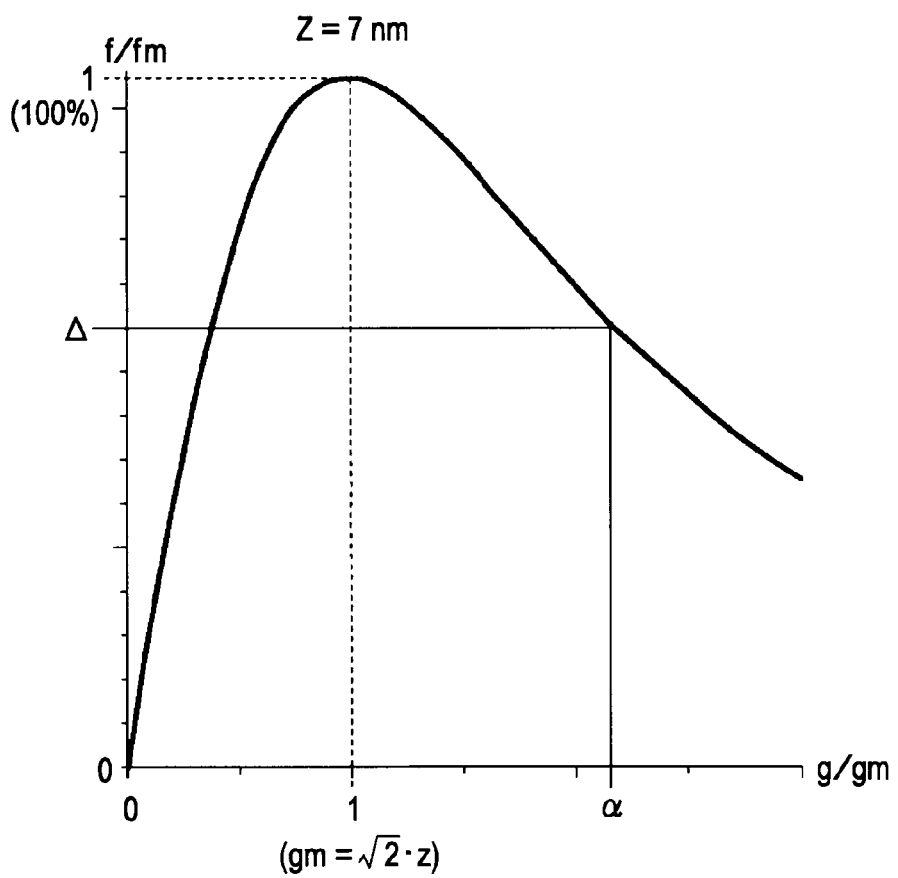
FIG. 21 shows a relationship between the field intensity at Z=7 nm and the size g of a gap between conductors.

The formula 1 is derived as discussed above. In the case of z=+7 nm, when the maximum value of the variable f is defined as fm, the gap size corresponding to the maximum value fm is defined as gm, and the variable f and the variable g represented by the vertical axis and the horizontal axis of FIG. 20 are converted into $\Delta(=f/fm)$ and $\alpha(=g/gm)$, respectively, the characteristic curve of FIG. 20 is converted into the characteristic curve of FIG. 21. The relationship between the variable $\Delta$ and the variable $\alpha$ shown in FIG. 21 is represented by the following formula 8:

$$\Delta = \frac{3\alpha\sqrt{3}}{(\alpha^2 + 2)^{3/2}} \quad \text{[Formula 8]}$$

When the range of the gap size g in which the variable $\Delta$ is about 60% ($\Delta$=0.6 in FIG. 21) of its peak value ($\Delta$=1 (100%)) is obtained from the formula 8, the range is from about 0.5071z to 3.286z. That is, in the case where the size g of the gap between the two conductors 6 and the distance z between the conductors 6 and the recording layer 20a satisfy the relationship g=0.5071z to 3.286z, it is possible to irradiate the recording layer 20a with near-field light at a field intensity of about 60% of the peak value.

Further, when the range of the gap size g in which the variable $\Delta$ is about 90% ($\Delta$=0.9) of its peak value is obtained from the formula 8, the range is from about 0.9284z to 2.0787z. That is, in the case where the size g of the gap between the two conductors 6 and the distance z between the conductors 6 and the recording layer 20a satisfy the relationship g=0.9284z to 2.0787z, it is possible to irradiate the recording layer 20a with near-field light at a field intensity of about 90% of the peak value.

SPECIFIC EXAMPLE

Figure 22:
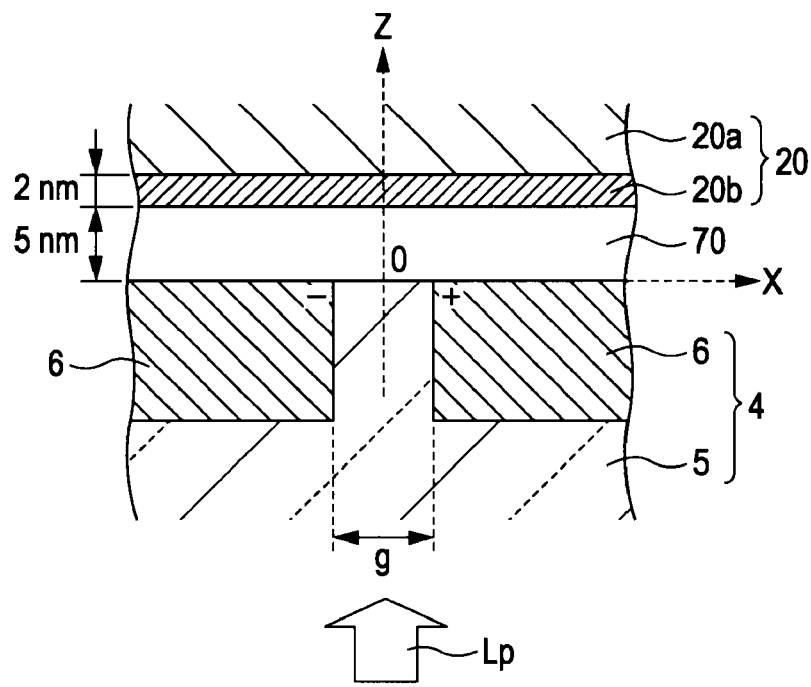
FIG. 22 shows the calculation conditions for simulation analysis according to the second embodiment.

The optimum relationship (formula 1) between the size g of the gap between the pair of conductors 6 and the distance z between the conductors 6 and the recording layer 20a described above was validated through FDTD simulation. FIG. 22 shows an overview of a model subjected to simulation analysis and the conditions for the analysis. FIG. 22 is an enlarged cross-sectional view of the boundary portion between the recording medium 20 and the floating slider head (near-field light production section 4).

In the simulation analysis, the substrate 5 of the near-field light production section 4 was formed from $SiO_2$, and the conductors 6 were formed from Au. The recording layer 20a was formed from a Co film, over which the protection film 20b was formed from a diamond-like carbon film. The distance between the conductors 6 and the protection film 20b, that is, the thickness of the air layer 70, was 5 nm, and the thickness of the protection film 20b was 2 nm. That is, the distance z between the conductors 6 and the recording layer 20a was 7 nm. The length L and the thickness t of each conductor 6 were 220 nm and 100 nm, respectively (see FIG. 2). Also in the example, the midpoint between the surfaces of the pair of conductors 6 was defined as the origin of a coordinate system with an X-axis, a Y-axis (the axis extending in the direction perpendicular to the sheet surface), and a Z-axis.

Figure 23:
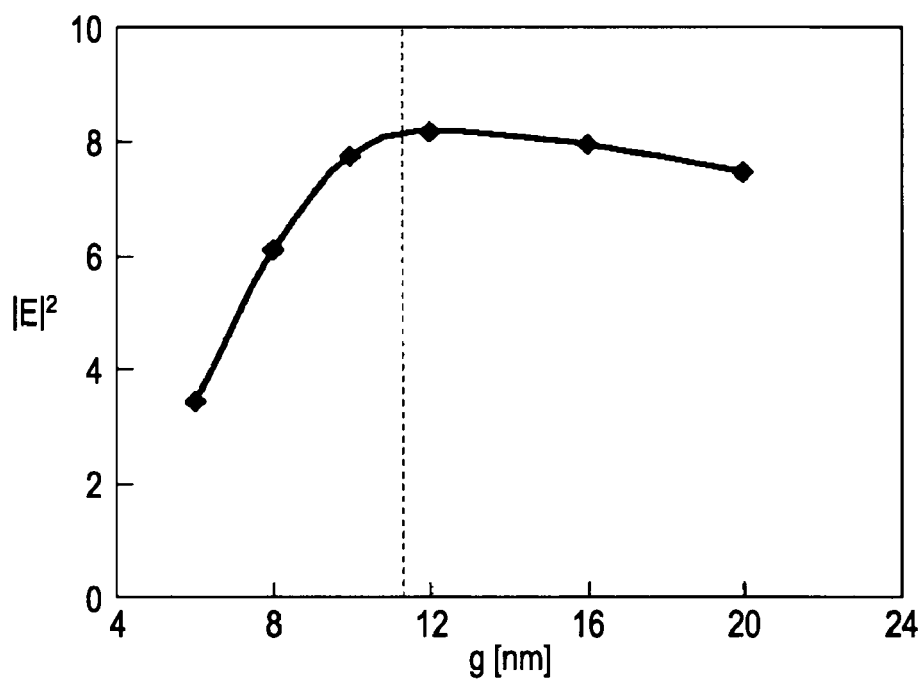
FIG. 23 shows the results of the simulation analysis according to the second embodiment.
Figure 24:
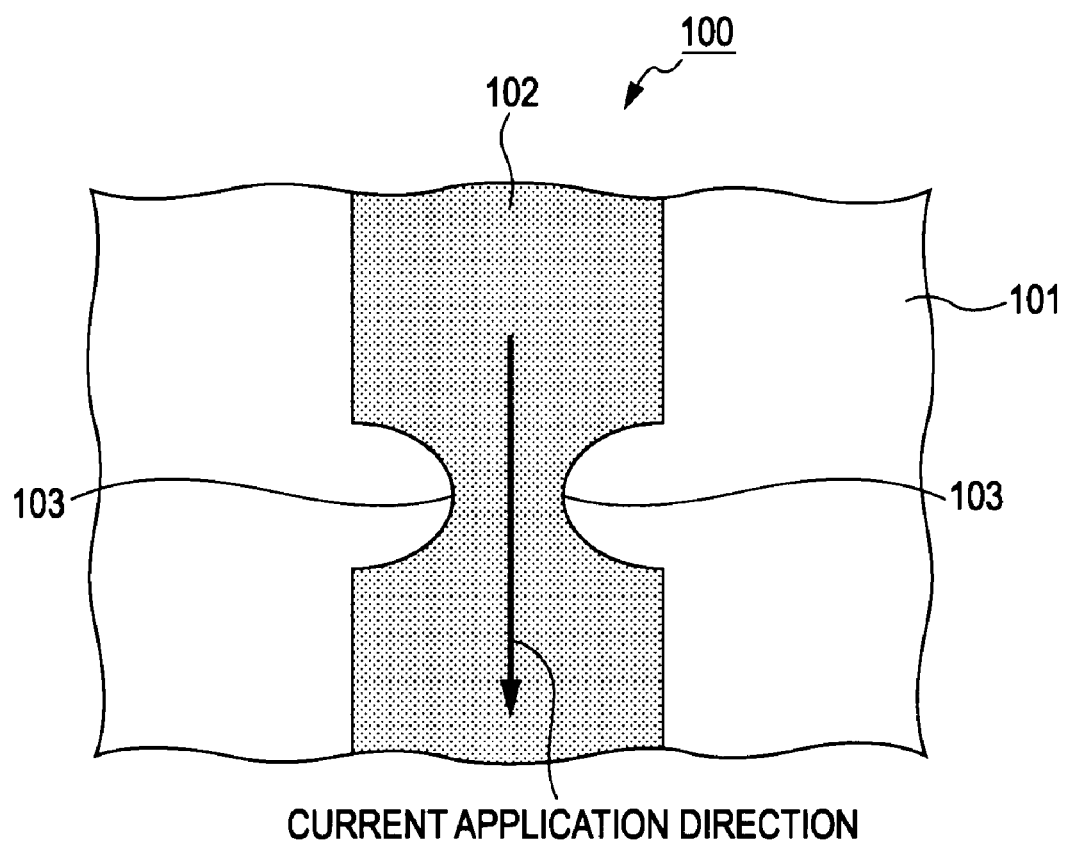
FIG. 24 shows a schematic configuration of a portion of a floating head for producing near-field light in the related art around a conductor.

In the simulation analysis according to the example, it was difficult to measure the electric field at the interface between the recording layer 20a and the protection film 20b because of the specifications of the simulation model. Therefore, the field intensity $|E|^2$ at a position 1 nm inside the recording layer 20a from the interface (Z=+8 nm) was obtained. That is, the field intensity $|E|^2$ at a position (X, Y, Z)=(0, 0, +8 nm) was obtained. FIG. 23 shows the analysis results.

In the chart of FIG. 23, the horizontal axis represents the size g of the gap between the pair of conductors 6, and the vertical axis represents the electric field $|E|^2$ at a position of Z=+8 nm. As is clear from FIG. 23, the value of $|E|^2$ varied with respect to the size g of the gap between the conductors 6 in the same way as in FIG. 21, and the gap size g of about 12 nm gave the maximum field intensity. Meanwhile, when a calculation was performed using the formula 1, the gap size g of 11.3 nm (indicated by the broken line in FIG. 23) gave the maximum field intensity at a position of z=8 nm. It is found from the above results that the gap size g that gave the maximum field intensity obtained through the FDTD simulation matched well with that obtained using the formula 1. This verifies that in the case where the relationship of the formula 1 is satisfied when information is recorded, the field intensity of near-field light with which the recording layer 20a is irradiated becomes maximum, allowing efficient irradiation of the recording medium 20 with near-field light.

Although the present invention is applied to a disc-like recording medium in the embodiment and the modifications described above, the present invention is not limited thereto. The present invention may be applied to recording media other than disc-like recording media such as card-like recording media, for example, to obtain the same effect.

The present application contains subject matter related to that disclosed in Japanese Priority Patent Application JP 2008-324271 filed in the Japan Patent Office on Dec. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording/reproduction apparatus comprising:
a light source; and
a near-field light production section that includes two conductor sections disposed opposite each other with a predetermined gap therebetween and that produces near-field light between the two conductor sections upon light irradiation from the light source, the two conductor sections being disposed such that, when information is recorded on a recording medium using the near-field light, an imaginary line passing through a point of each conductor section that is respectively closest to the other conductor section is perpendicular to a track direction of the recording medium.

2. The recording/reproduction apparatus according to claim 1,
wherein respective portions of the two conductor sections that oppose each other each have a convex shape.

3. The recording/reproduction apparatus according to claim 1,
wherein the recording medium includes recording tracks, adjacent ones of which are separated from each other.

4. The recording/reproduction apparatus according to claim 1,
wherein the recording medium includes recording mark regions formed separately in a predetermined pattern.

5. The recording/reproduction apparatus according to claim 4,
wherein a center of each recording mark region in a track is displaced from a center of each recording mark region in an adjacent track in a direction perpendicular to the track direction.

6. The recording/reproduction apparatus according to claim 1,
wherein a recording layer of the recording medium is formed as a continuous film.

7. The recording/reproduction apparatus according to claim 1,
wherein when a distance between the conductor sections and an information recording surface of the recording medium during irradiation of the recording medium with the near-field light is defined as z and a predetermined gap between the two conductor sections is defined as g, the distance z and the gap g generally satisfy the following relationship:

$$g=2^{1/2} \cdot z.$$

8. A recording/reproduction system comprising:
a recording medium;
a light source; and
a near-field light production section that includes two conductor sections disposed opposite each other with a predetermined gap therebetween and that produces near-field light between the two conductor sections upon light irradiation from the light source, the two conductor sections being disposed such that, when information is recorded on the recording medium using the near-field light, an imaginary line passing through a point of each conductor section that is respectively closest to the other conductor section is perpendicular to a track direction of the recording medium.

9. The recording/reproduction apparatus according to claim 1, wherein the light source is configured to emit light polarized in a direction parallel to the imaginary line passing through a point of each conductor section that is respectively closest to the other conductor section.

10. The recording/reproduction apparatus according to claim 1, wherein the light source is configured to emit light having a wavelength of 780 nm.

11. The recording/reproduction apparatus according to claim 1, further comprising a collimator lens and a condensing lens.

12. The recording/reproduction apparatus according to claim 1, wherein the track direction of the recording medium defines a track along which recording marks are read and written.

* * * * *